United States Patent
Fukuda

(10) Patent No.: US 10,382,740 B2
(45) Date of Patent: Aug. 13, 2019

(54) IMAGE PROCESSING APPARATUS, METHOD FOR CONTROLLING THE SAME, AND IMAGE CAPTURE APPARATUS

(71) Applicant: CANON KABUSHIKI KAISHA, Tokyo (JP)

(72) Inventor: Atsushi Fukuda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/569,246

(22) PCT Filed: Apr. 25, 2016

(86) PCT No.: PCT/JP2016/002172
§ 371 (c)(1),
(2) Date: Oct. 25, 2017

(87) PCT Pub. No.: WO2016/178310
PCT Pub. Date: Nov. 10, 2016

(65) Prior Publication Data
US 2018/0124377 A1  May 3, 2018

(30) Foreign Application Priority Data
May 1, 2015  (JP) ................. 2015-094440

(51) Int. Cl.
*H04N 13/00* (2018.01)
*H04N 13/139* (2018.01)
(Continued)

(52) U.S. Cl.
CPC ......... *H04N 13/189* (2018.05); *H04N 13/139* (2018.05); *H04N 13/218* (2018.05); *H04N 2013/0088* (2013.01)

(58) Field of Classification Search
CPC .. H04N 13/218; H04N 13/189; H04N 13/139; H04N 5/23232
See application file for complete search history.

(56) References Cited

U.S. PATENT DOCUMENTS 4,410,804 A    10/1983   Stauffer
2010/0195920 A1  8/2010   Tago
(Continued)

FOREIGN PATENT DOCUMENTS

EP    2046020 A1    4/2009
JP    2002300372 A  10/2002
(Continued)

OTHER PUBLICATIONS

International Search Report and Written Opinion dated Jun. 27, 2016 in corresponding International Application No. PCT/JP2016/002172, 11 pages.
(Continued)

*Primary Examiner* — Nelson D. Hernández-Hernández
(74) *Attorney, Agent, or Firm* — Carter, DeLuca & Farrell LLP

(57) ABSTRACT

Provided are an image processing apparatus and a method for controlling the same, the image processing apparatus being capable of generating a versatile image file with a suppressed file size from a portion of multiple first images and a second image that can be generated from the multiple first images. In the case of generating an image file from a portion of the multiple first images and the second image that can be generated from the multiple first images, an image file is generated such that the image file does not contain data of, among the multiple first images, a first image that can be generated from a first image and the second image stored in the image file.

18 Claims, 18 Drawing Sheets

(51) Int. Cl.
*H04N 13/189* (2018.01)
*H04N 13/218* (2018.01)

(56) References Cited

U.S. PATENT DOCUMENTS

| | | |
|---|---|---|
| 2011/0007087 A1 | 1/2011 | Ivanich et al. |
| 2013/0076869 A1 | 3/2013 | Mukunashi |
| 2013/0083166 A1* | 4/2013 | Shintani ............... H04N 13/239 348/46 |
| 2013/0093859 A1 | 4/2013 | Nakamura |
| 2013/0222553 A1 | 8/2013 | Tsuchita |

FOREIGN PATENT DOCUMENTS

| | | |
|---|---|---|
| JP | 2002320195 A | 10/2002 |
| JP | 2013118459 A | 6/2013 |
| JP | 2013118464 A | 6/2013 |

OTHER PUBLICATIONS

Ng et al., "Light Field Photography with a Hand-held Plenoptic Camera," Stanford Tech Report CTSR, Feb. 2005, Apr. 2005, pp. 1-11.

Japanese Office Action for application No. 2015-094440 dated Feb. 18, 2019 with English translation.

\* cited by examiner

[Fig. 1]
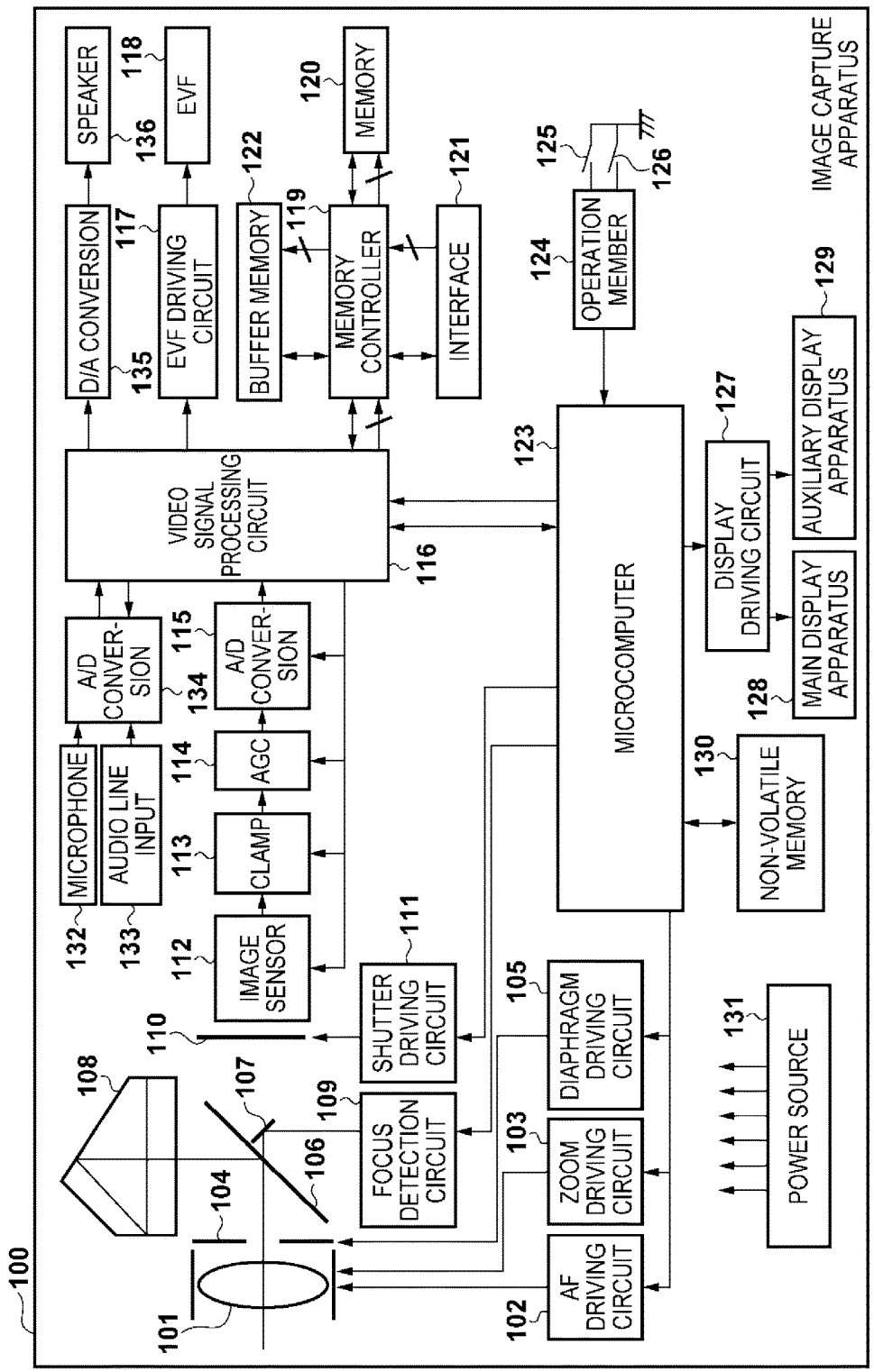

[Fig. 2]
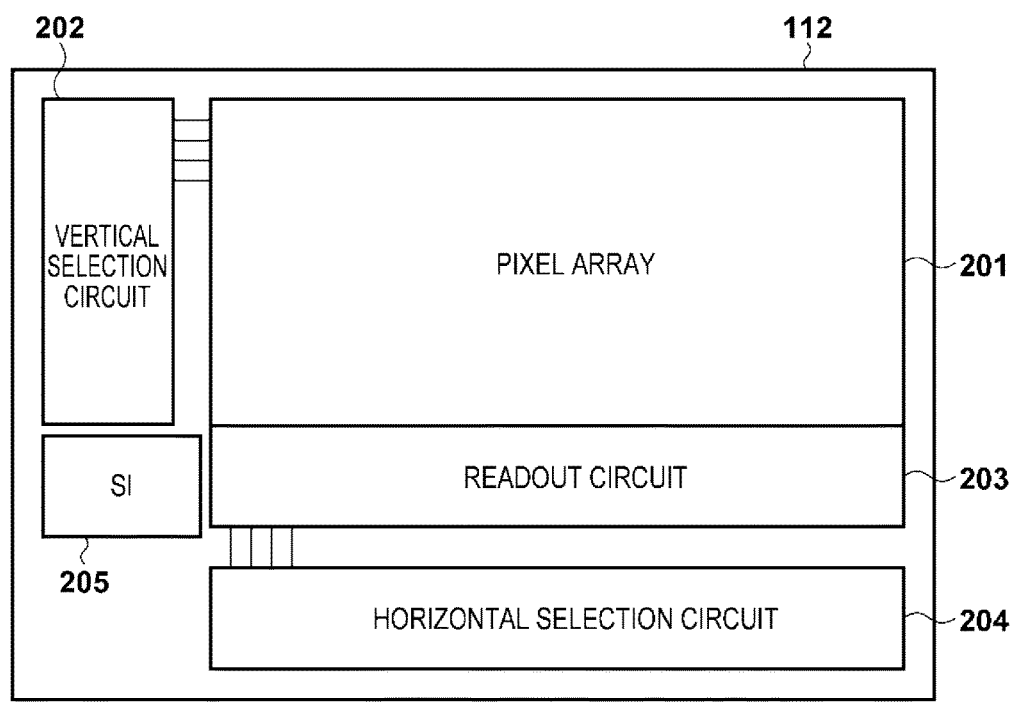

[Fig. 3A]
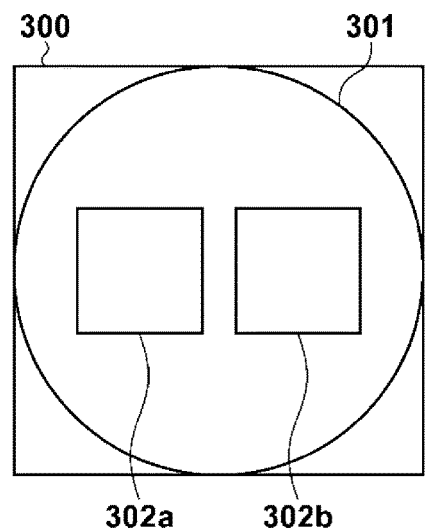
[Fig. 3B]
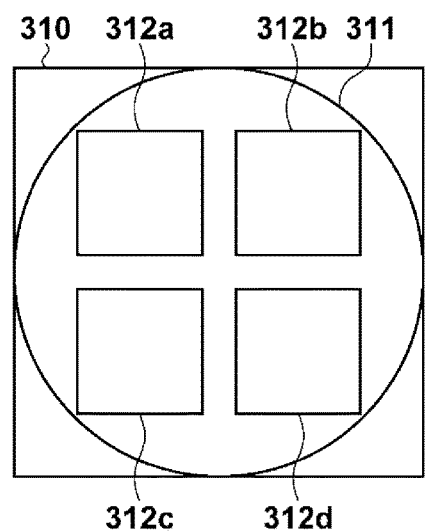

[Fig. 4]
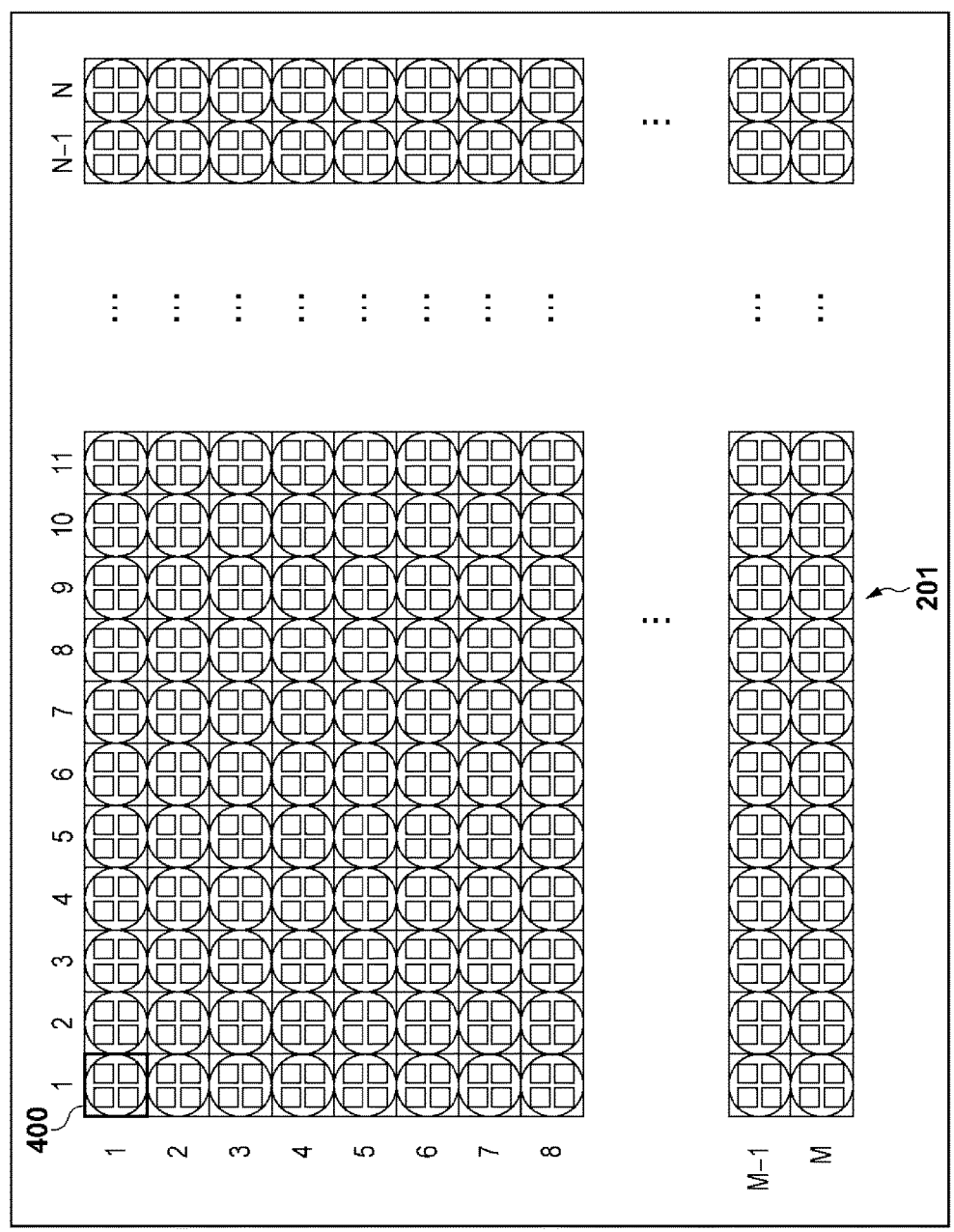

[Fig. 5]
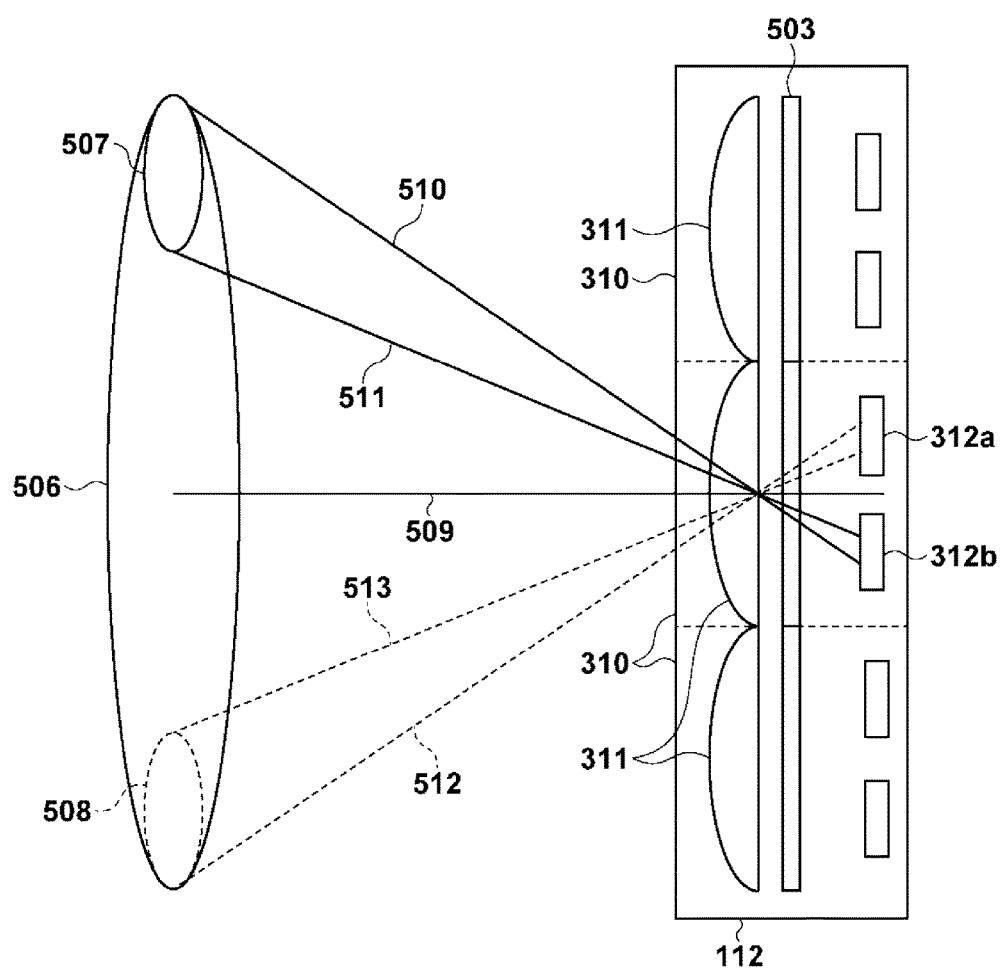

[Fig. 6A]
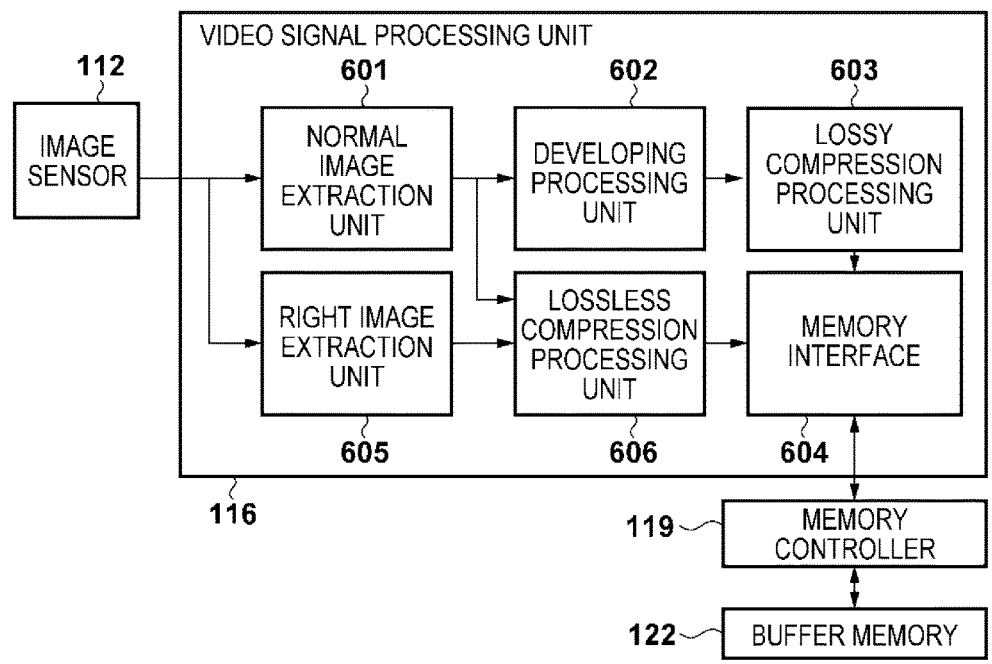
[Fig. 6B]
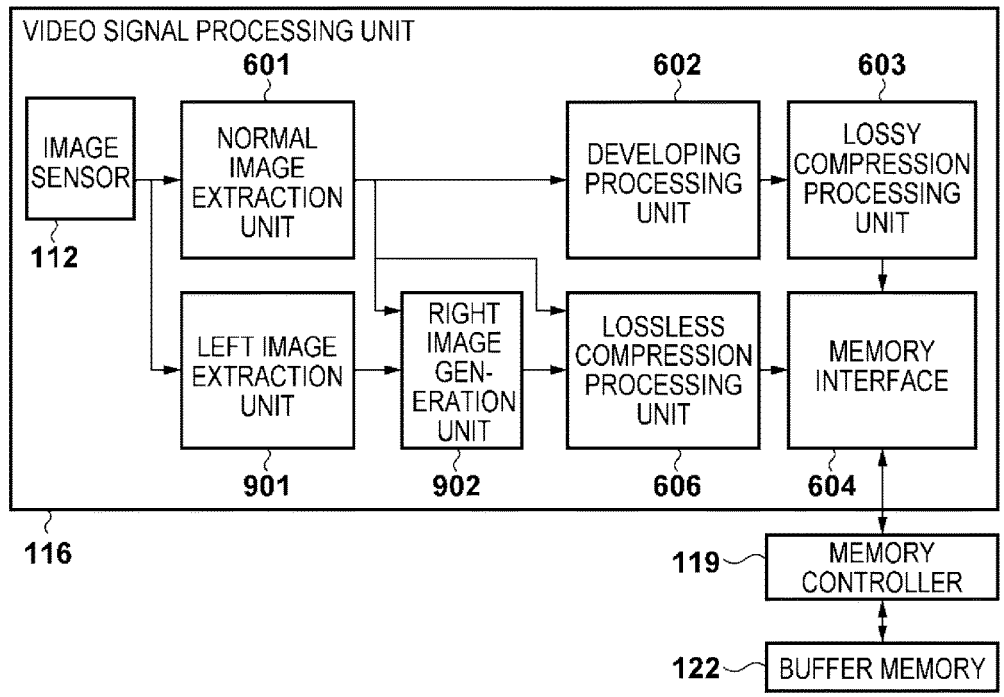

[Fig. 6C]
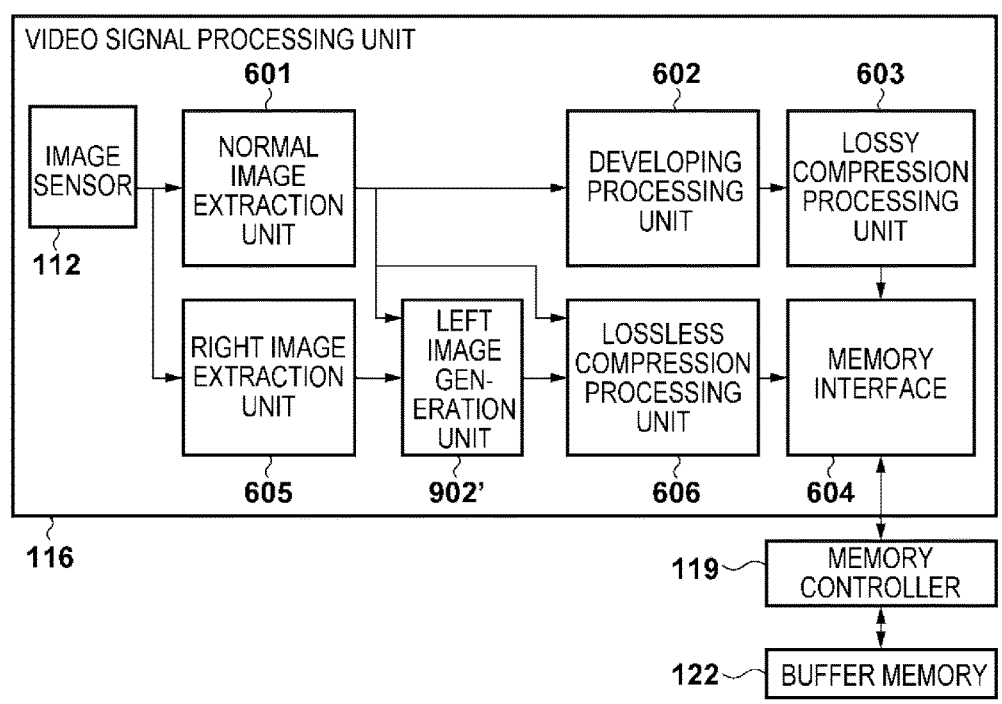

[Fig. 7A]
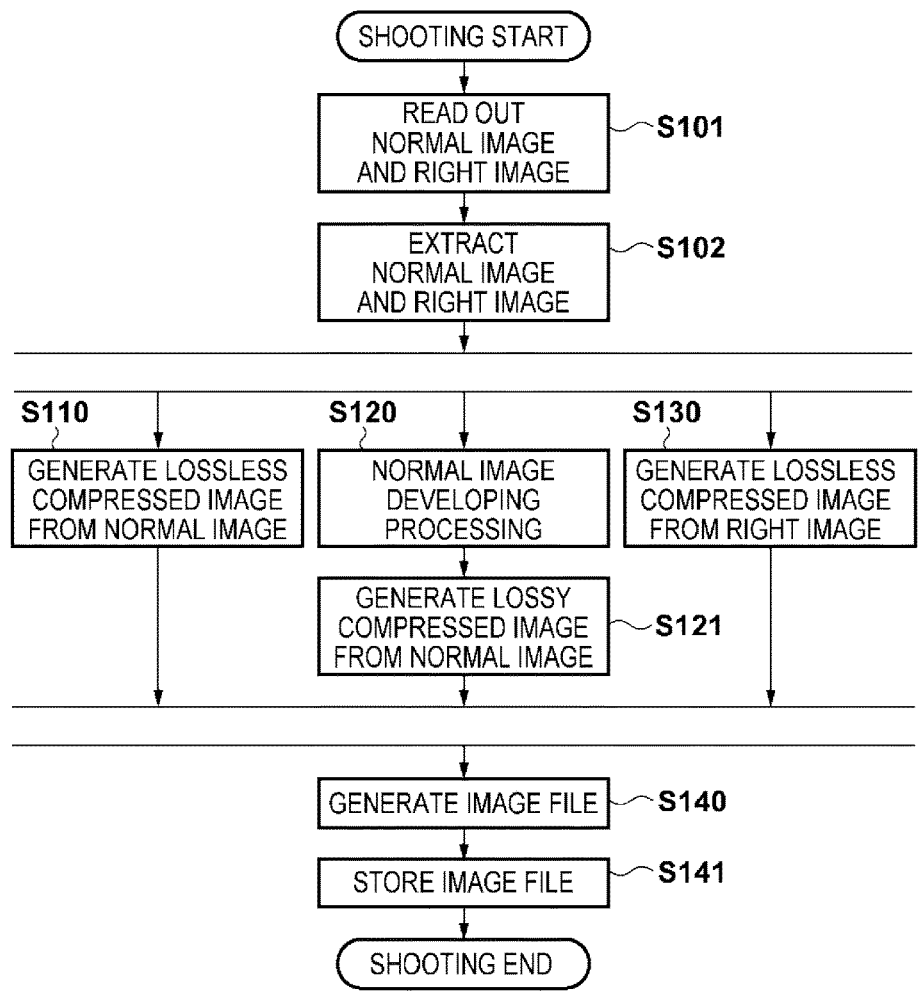
[Fig. 7B]
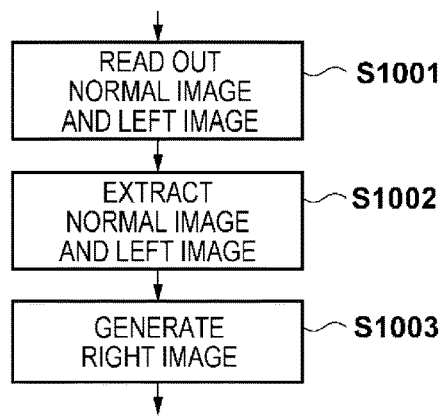

[Fig. 8A]
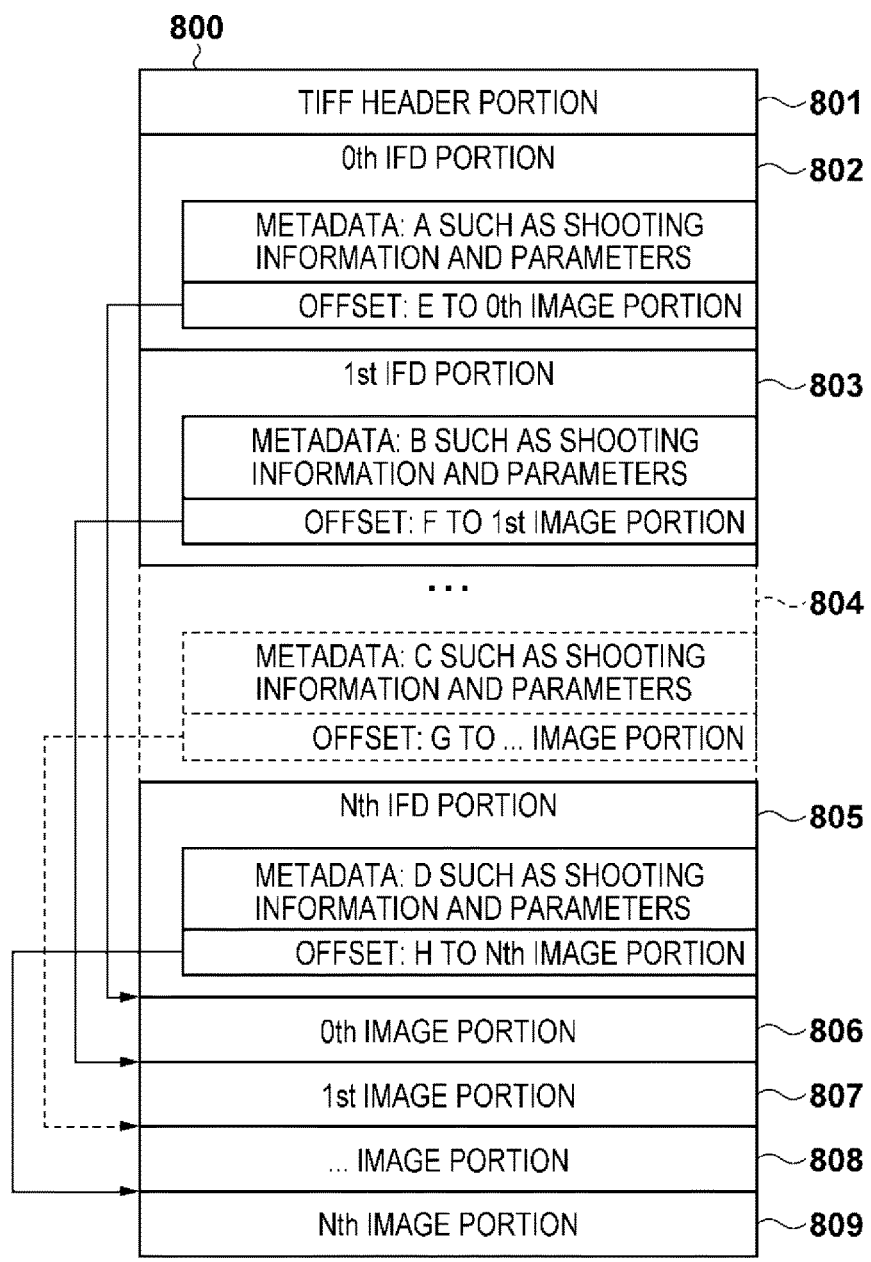

[Fig. 8B]
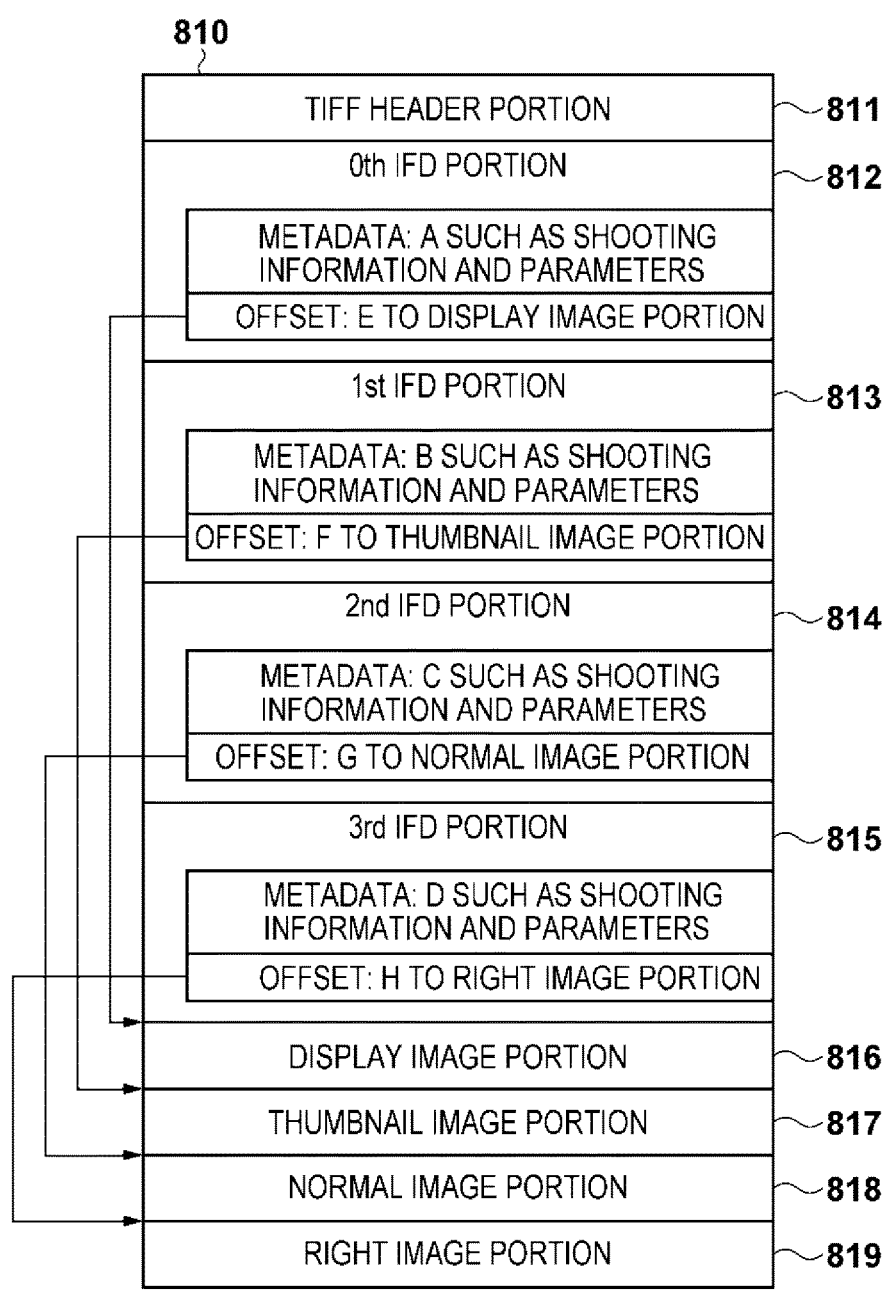

[Fig. 9]
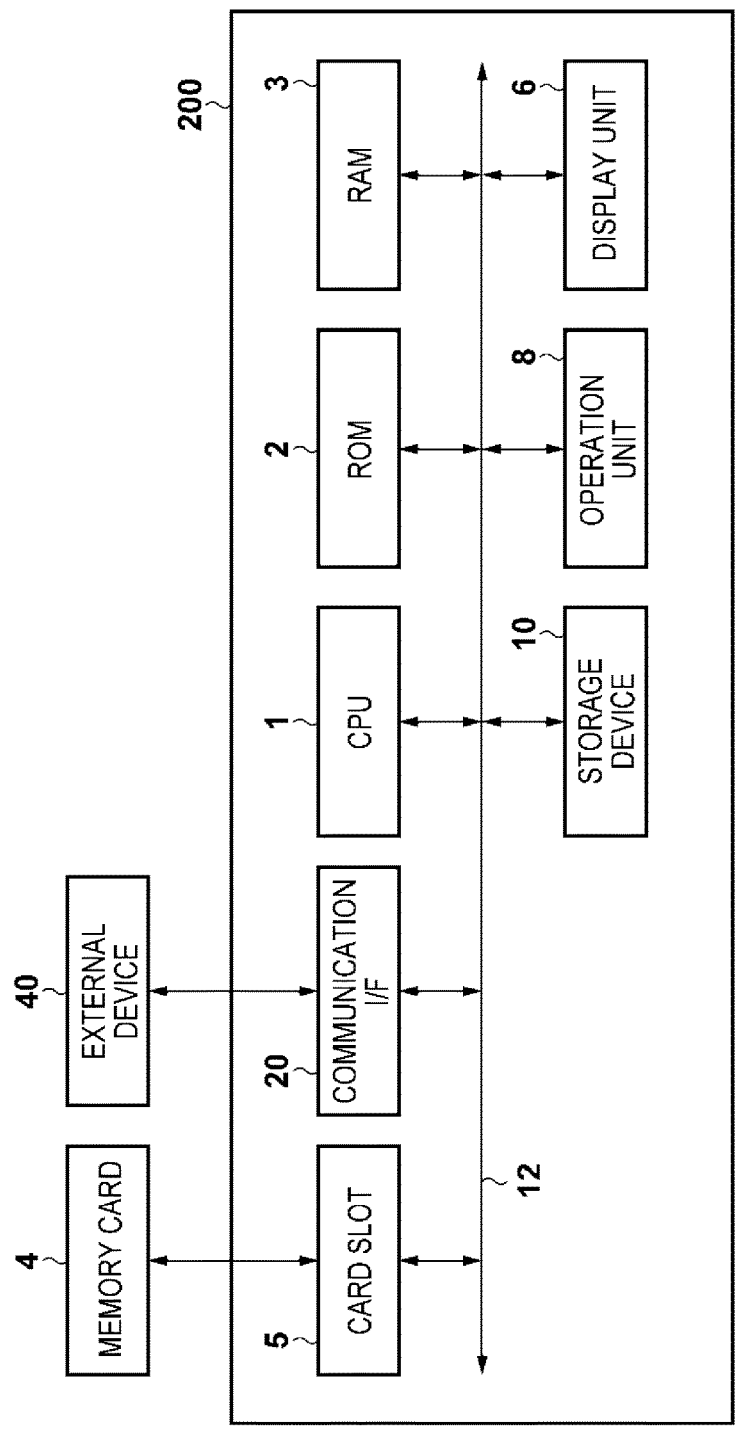

[Fig. 10A]
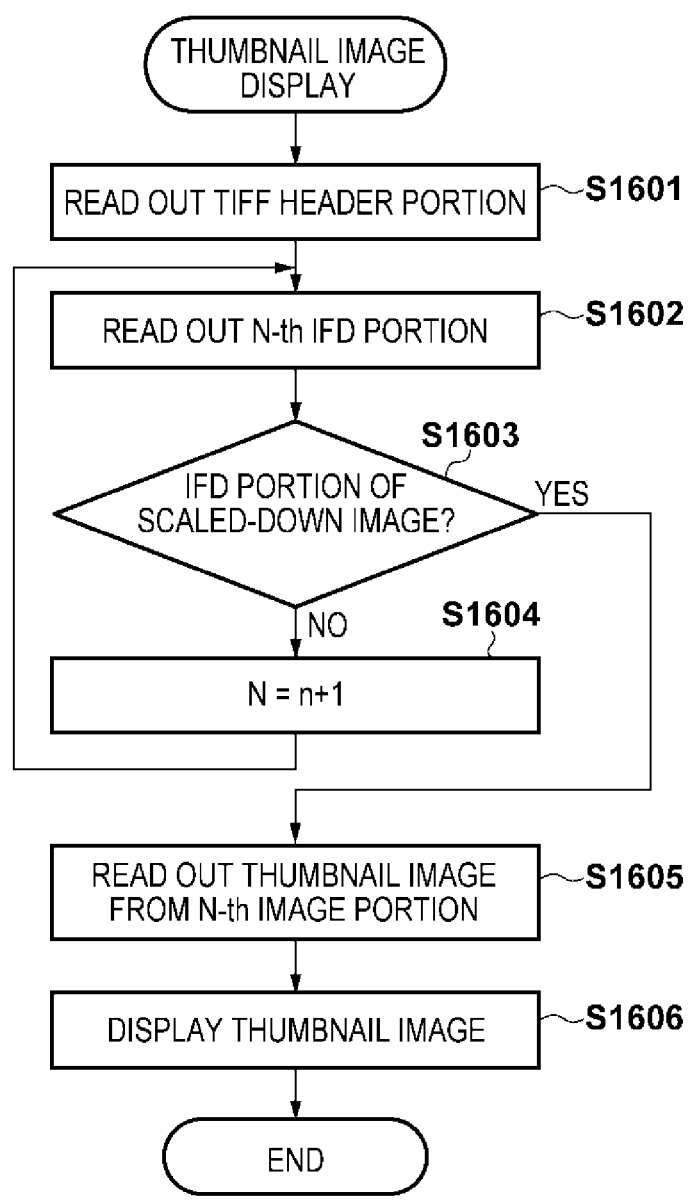

[Fig. 10B]
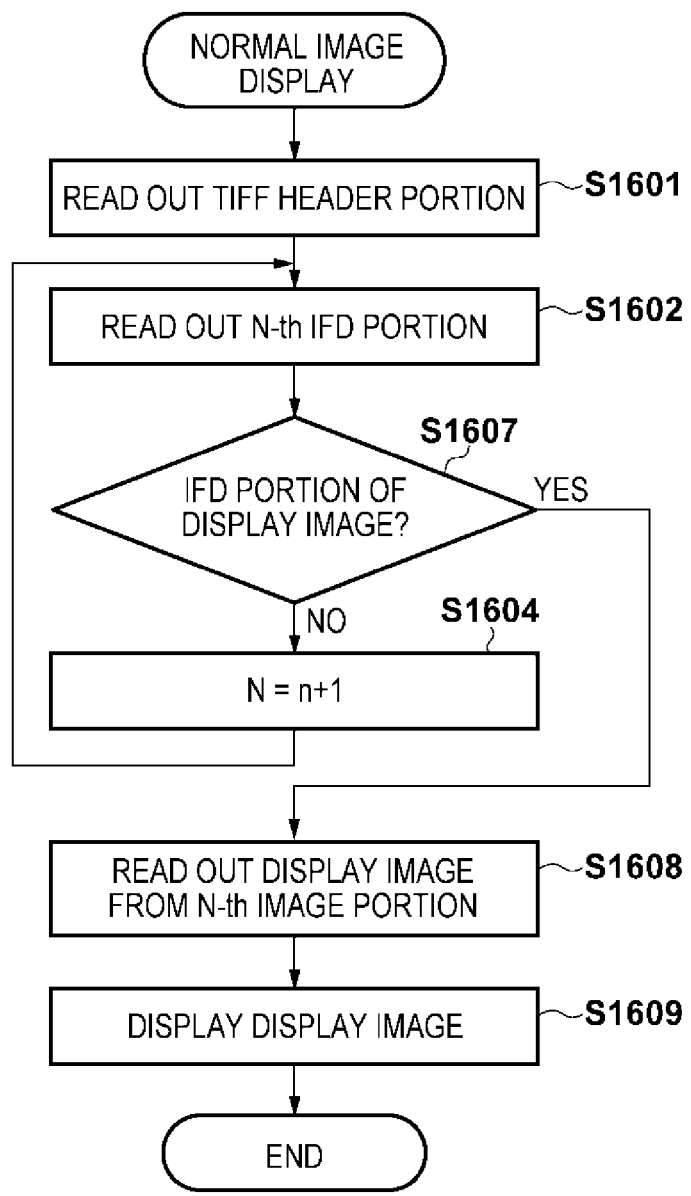

[Fig. 11]
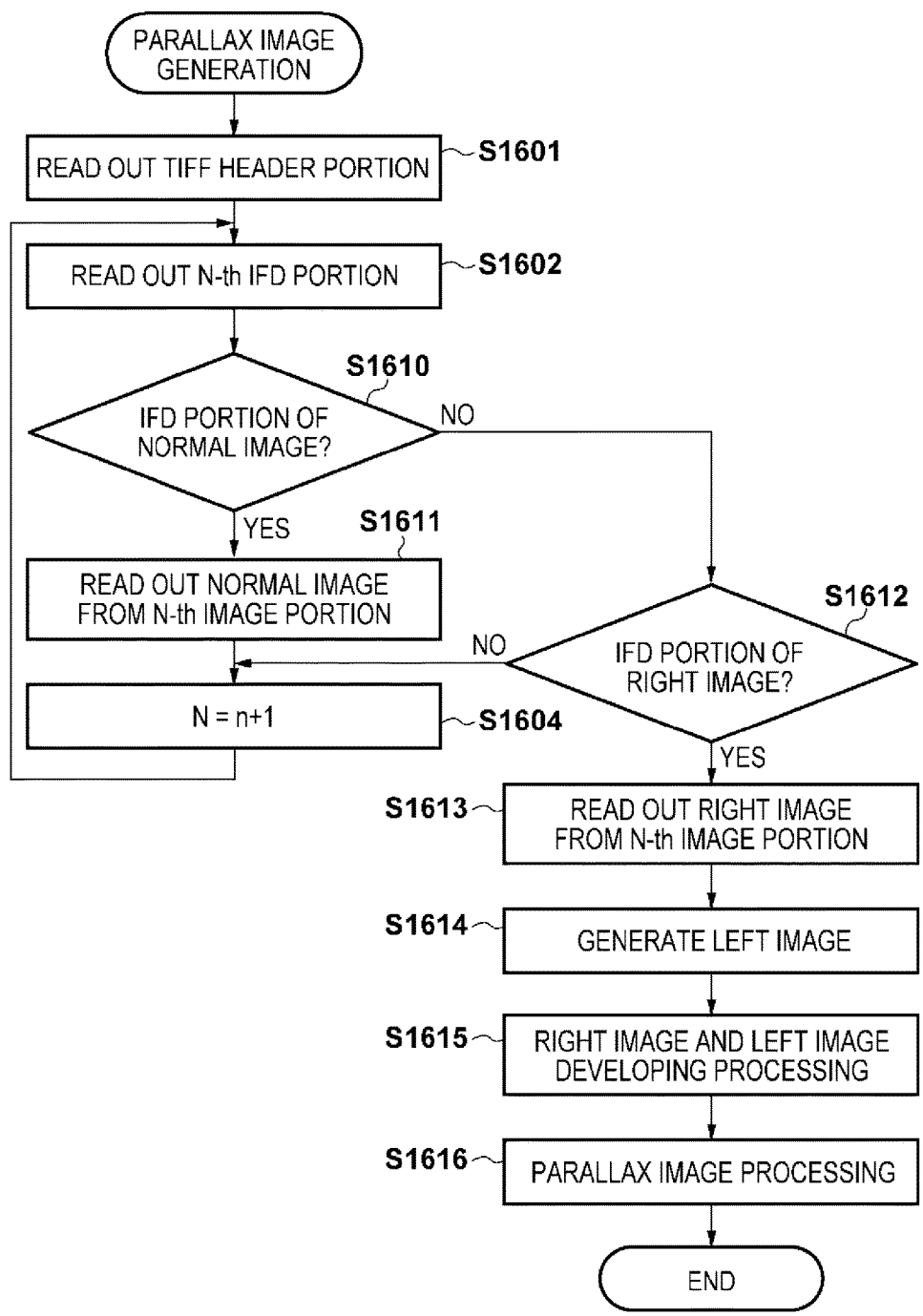

[Fig. 12]
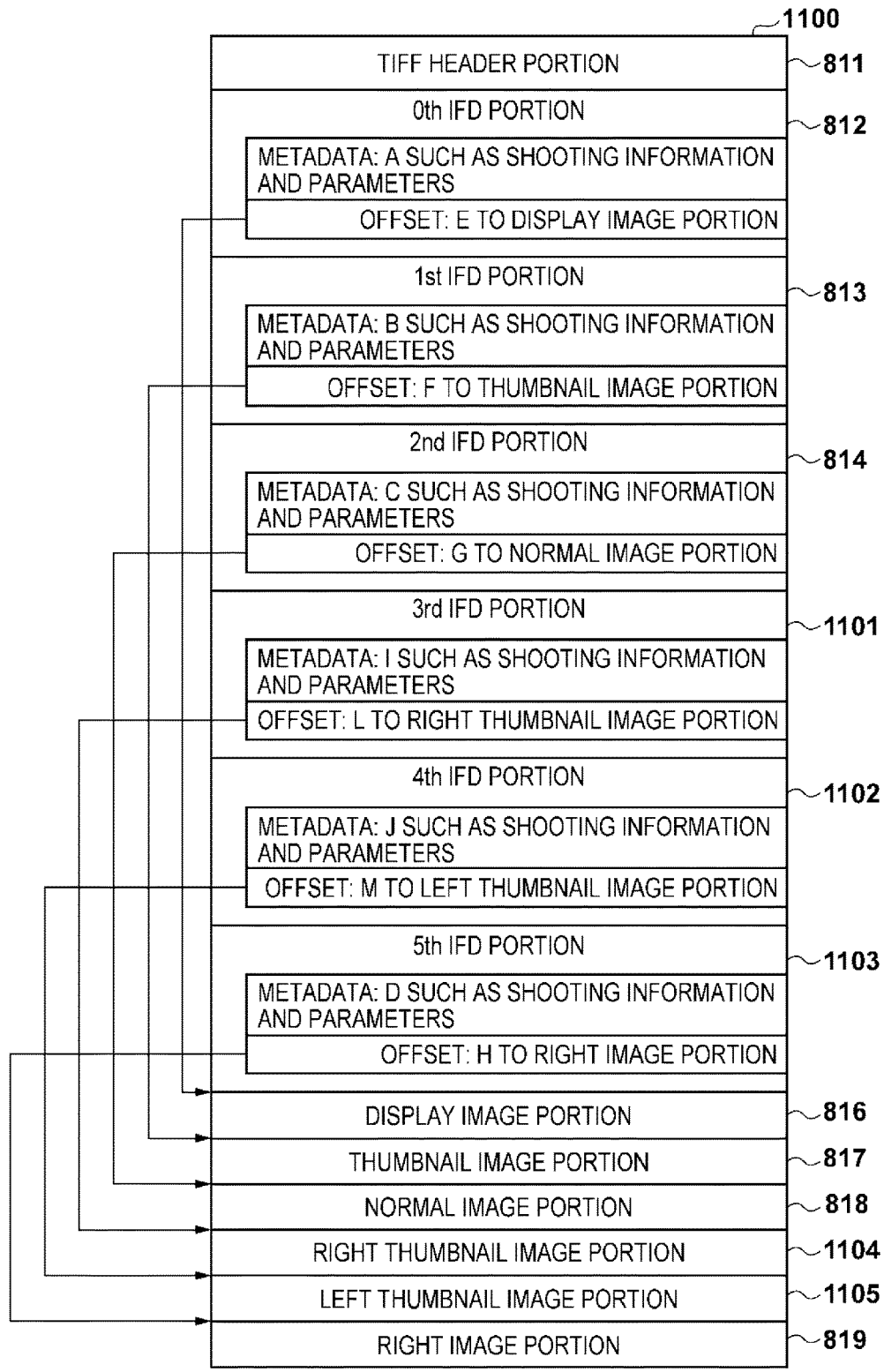

[Fig. 13]
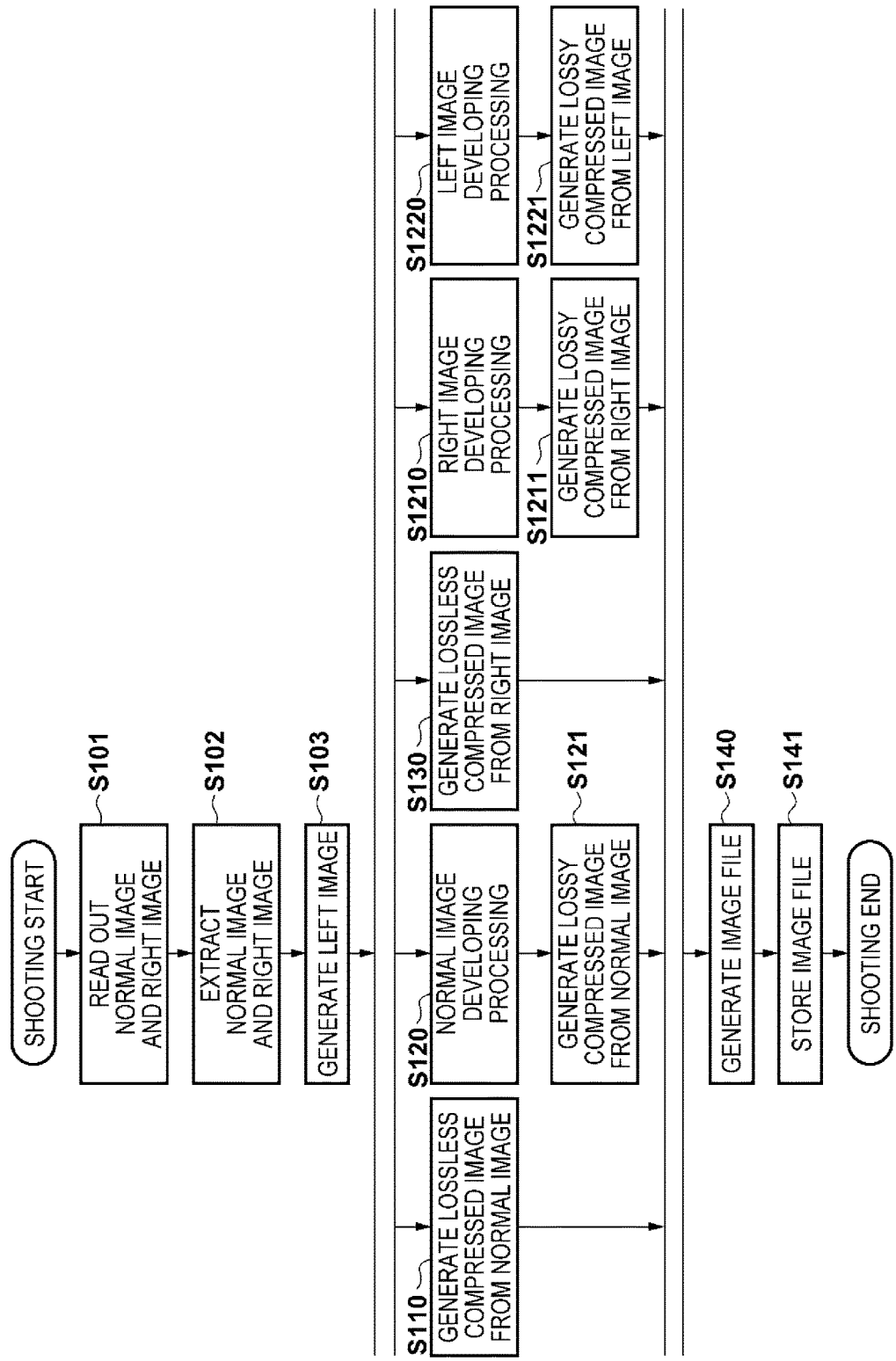

[Fig. 14]
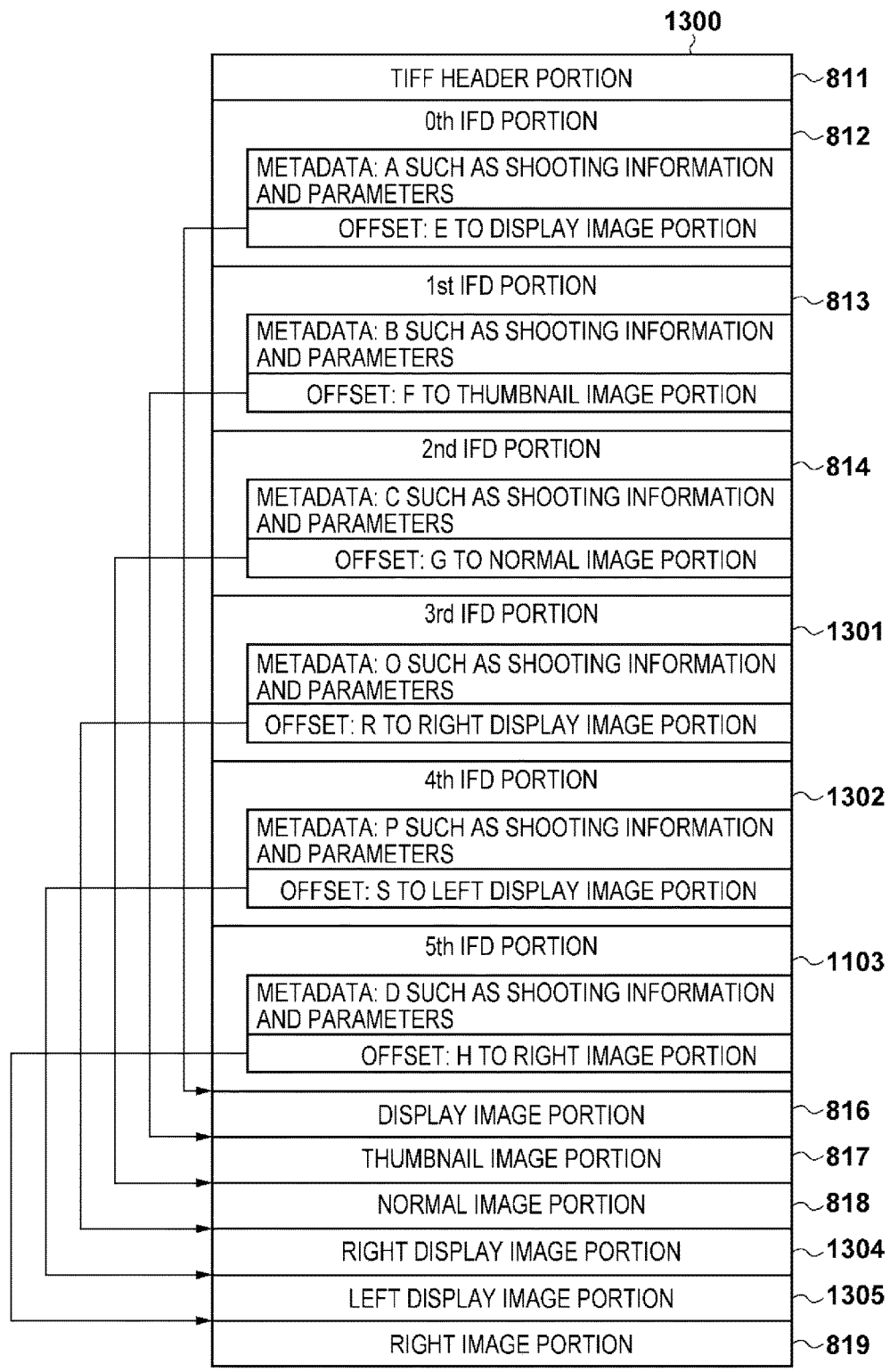

[Fig. 15]
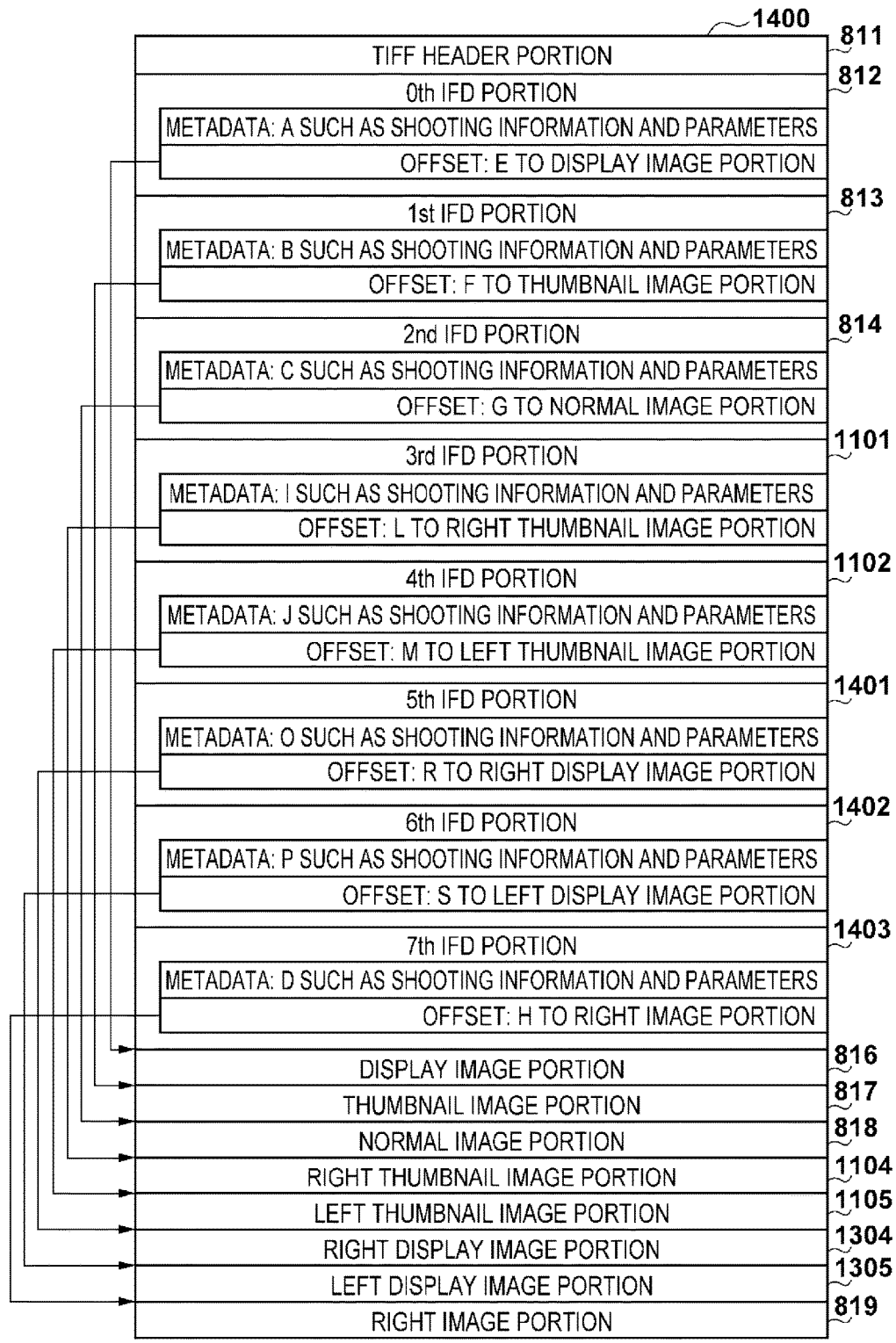

IMAGE PROCESSING APPARATUS, METHOD FOR CONTROLLING THE SAME, AND IMAGE CAPTURE APPARATUS

CROSS REFERENCE TO RELATED APPLICATIONS

This application is a U.S. National Stage entry of International Application No. PCT/JP2016/002172, filed on Apr. 25, 2016, which claims priority to Japanese Patent Application No. 2015-094440, filed on May 1, 2015, the disclosures of each of which are hereby incorporated by reference herein in their entirety.

TECHNICAL FIELD

The present invention relates to an image processing apparatus, a method for controlling the same, and an image capture apparatus, and in particular relates to a technique for storing image data.

BACKGROUND ART

There are known to be image capture apparatuses in which an exit pupil of a shooting lens (imaging optical system) is divided into multiple pupil regions, and according to which multiple images that each correspond to one pupil region can be generated with one shooting operation (U.S. Pat. No. 4,410,804). These multiple images are images with parallax (parallax images), and therefore are pieces of information representing not only the spatial distribution but also the angular distribution of the light intensity, and have properties similar to data known as light field (LF) data and light space data.

Ren Ng et al, "Light Field Photography with a Hand-Held Plenoptic Camera", Stanford Tech Report CTSR 2005-02, 2005 Apr. 20) discloses a refocus technique in which the in-focus position of the captured image is changed after shooting by using LF data to combine images in an imaging plane (virtual imaging plane) different from that at the time of shooting.

In the case of using a configuration in which a pupil region is divided using an image sensor with pixels each having multiple (n) divided photoelectric conversion regions, a maximum of n parallax images are generated with one shooting operation. For this reason, the amount of image data is that of n times the number of images that would have been generated if the pupil region was not divided. Furthermore, if an image corresponding to a normal image is generated by adding together the parallax images with consideration given to compatibility with a device that does not support parallax images, the amount of data corresponds to a factor of n+1.

If all of the parallax images and the normal image are stored by being included in one image file, the file size will be extremely large, the consumption amount of the storage medium will increase, the amount of time needed for reading and writing will increase, and battery consumption will increase. Also, if only the parallax images are stored, for example, there may also be a problem with file compatibility with apparatuses that do not support parallax images. This kind of problem occurs also when generating an image file containing data of images having a relationship between a part and the whole (or in which one image is generated from another image), as with the multiple parallax images (first images) and a normal image (second image).

SUMMARY OF INVENTION

The present invention has been made in view of such problems in the conventional technology. The present invention provides an image processing apparatus and a method for controlling the same, the image processing apparatus being capable of generating a versatile image file with a suppressed file size from a portion of multiple first images and a second image generated from the multiple first images.

According to an aspect of the present invention, there is provided an image processing apparatus comprising: first obtaining means for obtaining data of one or more of a plurality of first images; second obtaining means for obtaining data of a second image that can be generated from the plurality of first images; and file generation means for generating an image file containing the data of the second image and data of a portion of the plurality of first images, wherein the file generation means generates the image file such that the image file does not contain, among the plurality of first images, data of a first image that can be generated from a first image and the second image stored in the image file.

According to another aspect of the present invention, there is provided an image capture apparatus comprising: an image sensor capable of generating data of a plurality of first images and data of a second image; and the image processing apparatus according to the present invention.

According to a further aspect of the present invention, there is provided an electronic device comprising: obtaining means for obtaining an image file containing data for a portion of a plurality of first images, and data of a second image that can be generated from the plurality of first images; generation means for generating data of, among the plurality of first images, a first image not contained in the image file from the data of the second image and the data of the first image contained in the image file; and image processing means for applying image processing to the data of the first image contained in the file and to the data of the first image generated by the generation means.

According to a further aspect of the present invention, there is provided an image processing system comprising: the image processing apparatus according to the present invention, or the image capture apparatus according to the present invention; and the electronic device according to the present invention, the image processing apparatus or the image capture apparatus, and the electronic device being communicably connected.

According to a further aspect of the present invention, there is provided a method for controlling an image processing apparatus, comprising: obtaining data of one or more of a plurality of first images; obtaining data of a second image corresponding to a combined image of the plurality of first images; and generating an image file containing the data of the second image and data of a portion of the plurality of first images, wherein the image file is generated such that the image file does not contain data of, among the plurality of first images, a first image that can be generated from a first image and the second image stored in the image file.

According to a further aspect of the present invention, there is provided a method for controlling an electronic device, comprising: obtaining an image file containing data of a portion of a plurality of first images, and data of a second image corresponding to a combined image of the plurality of first images; generating data of, among the plurality of first images, a first image not contained in the image file from the data of the second image and the data of the first image contained in the image file; and applying image processing to the data of the first image contained in the image file and to the data of the first image generated in the generating.

According to a further aspect of the present invention, there is provided a computer-readable storage medium containing a program for causing a computer to function as the means included in the image processing apparatus according to the present invention.

According to a further aspect of the present invention, there is provided a computer-readable storage medium containing a program for causing a computer to function as the means included in the electronic device according to the invention.

Further features of the present invention will become apparent from the following description of exemplary embodiments with reference to the attached drawings.

BRIEF DESCRIPTION OF DRAWINGS

FIG. 1 is a block diagram showing an example of a functional configuration of an image capture apparatus serving as an example of an image processing apparatus according to an embodiment of the present invention.

FIG. 2 is a diagram schematically showing a circuit configuration of an image sensor shown in FIG. 1.

FIG. 3A is a diagram schematically showing examples of configurations of pixels of the image sensor shown in FIG. 1 that are arranged in a pixel array.

FIG. 3B is a diagram schematically showing examples of configurations of pixels of the image sensor shown in FIG. 1 that are arranged in a pixel array.

FIG. 4 is a diagram schematically showing a pixel array in which pixels with the configuration shown in FIG. 3B are arranged.

FIG. 5 is a diagram schematically showing a relationship between light fluxes received by PDs and regions of an exit pupil in the image sensor having the pixel array shown in FIG. 4.

FIG. 6A is a block diagram showing examples of functional configurations of a video signal processing circuit according to an embodiment.

FIG. 6B is a block diagram showing examples of functional configurations of a video signal processing circuit according to an embodiment.

FIG. 6C is a block diagram showing examples of functional configurations of a video signal processing circuit according to an embodiment.

FIG. 7A is a flowchart showing examples of operations at a time when an image capture apparatus according to a first embodiment performs shooting.

FIG. 7B is a flowchart showing examples of operations at a time when an image capture apparatus according to a first embodiment performs shooting.

FIG. 8A is a schematic diagram for illustrating the structure of an image file according to a first embodiment.

FIG. 8B is a schematic diagram for illustrating the structure of an image file according to a first embodiment.

FIG. 9 is a block diagram showing an example of a functional configuration of a computer device serving as an example of an electronic device capable of using an image file generated by an image capture apparatus according to an embodiment.

FIG. 10A is a flowchart showing examples of operations performed by the electronic device of FIG. 9.

FIG. 10B is a flowchart showing examples of operations performed by the electronic device of FIG. 9.

FIG. 11 is a flowchart showing another example of an operation performed by the electronic device of FIG. 9.

FIG. 12 is a schematic diagram for illustrating the structure of an image file according to a second embodiment.

FIG. 13 is a flowchart showing an example of an operation at a time when an image capture apparatus according to a second embodiment performs shooting.

FIG. 14 is a schematic diagram for illustrating the structure of an image file according to a modified example of the second embodiment.

FIG. 15 is a schematic diagram for illustrating the structure of an image file according to another modified example of the second embodiment.

DESCRIPTION OF EMBODIMENTS

Exemplary embodiments of the present invention will now be described in detail in accordance with the accompanying drawings. Note that the embodiments described below describe a configuration in which the present invention is applied to an image capture apparatus serving as an example of an image processing apparatus, but in the present invention, the configuration for generating a normal image (second image) and parallax images (first images) is not essential. For example, a configuration may be used in which data of parallax images (and also a normal image, as needed) that has already been stored as an image file of some format is obtained from a storage apparatus or an external apparatus.

First Embodiment

FIG. 1 is a block diagram showing an example of a functional configuration of an image capture apparatus 100, or more specifically, a digital single-lens reflex camera, which serves as an example of an image processing apparatus according to an embodiment of the present invention.

A microcomputer 123 that functions as a control unit has a ROM and a RAM, executes programs stored in the ROM or a non-volatile memory 130 by loading them in the RAM, and controls the units of the image capture apparatus 100, whereby the various functions of the image capture apparatus 100 are realized.

An AF driving unit 102 includes a DC motor or a stepping motor, for example, and changes the position of a focus lens of a shooting lens 101 in accordance with control performed by the microcomputer 123, thereby changing the focus distance of the shooting lens 101.

A zoom driving unit 103 includes a DC motor or a stepping motor, for example, and changes the position of a magnification lens of the shooting lens 101 in accordance with control performed by the microcomputer 123, thereby changing the focus distance of the shooting lens 101.

A diaphragm driving unit 105 drives a diaphragm 104 in accordance with control performed by the microcomputer 123 and changes the aperture value (diaphragm value). A main mirror 106 switches the advancing direction of a light flux incident thereon from the shooting lens 101 between toward an optical finder 108 and toward an image sensor 112. The optical finder 108 is constituted by a pentaprism, a focus plate, an eyepiece lens, and the like. When shooting is not being performed, the main mirror 106 is at a position (not shown) of reflecting an incident light flux toward the optical finder 108, and when shooting is being performed, the main mirror 106 withdraws to a position of not reflecting the incident light flux (mirror up), allowing the image sensor 112 to be exposed to light. The main mirror 106 is a half-mirror in the central portion thereof, and a portion of the light flux is transmitted at the position shown in the diagram. The transmitted light flux is reflected by a sub-mirror 107 arranged on the rear surface of the main mirror 106 and is incident on a focus detection sensor included in a focus detection circuit 109.

The focus detection circuit 109 is a circuit for phase-difference AF and includes a focus detection optical system and a focus detection sensor. A focus misalignment amount (defocus amount) and misalignment direction of the shooting lens 101 can be detected using the output of the focus detection circuit 109. The microcomputer 123 converts the detection result into the drive amount and drive direction of the focus lens so as to control the AF drive unit 102 and drive the focus lens of the shooting lens.

A shutter driving circuit 111 opens and closes a focal plane shutter 110 in accordance with control performed by the microcomputer 123. For example, the image sensor 112 is a CCD image sensor, a CMOS image sensor, or the like, and converts a subject image formed by the shooting lens 101 into an electric signal.

A clamp circuit 113 and an AGC circuit 114 apply analog signal processing before A/D conversion to the output of the image sensor 112. The clamp level and the AGC reference level are controlled by the microcomputer 123. An A/D conversion unit 115 converts the output of the AGC circuit 114 into a digital signal and outputs the resulting signal to a video signal processing circuit 116. An EVF driving circuit 117 performs display control of an EVF (electronic view finder) monitor 118.

A memory controller 119 controls communication of data between the memory 120, an interface 121, a buffer memory 122, and the video signal processing circuit 116. The interface 121 realizes communication with an external device such as a computer.

The memory controller 119 stores unprocessed digital images and audio data input from the video signal processing circuit 116 in the buffer memory 122 and stores processed digital images and audio data in the memory 120. The memory controller 119 also outputs images and audio data contained in the buffer memory 122 and the memory 120 to the video signal processing circuit 116. The memory 120 can be removed from the image capture apparatus 100 in some cases. The memory controller 119 can output the digital images and audio data contained in the memory 120 to an external apparatus via the interface 121.

The video signal processing circuit 116 is realized by a logic device such as a gate array, for example. The video signal processing circuit 116 applies filter processing, color conversion processing, gamma processing, encoding processing, and the like to the image data according to necessity and settings, and outputs the resulting data to the memory controller 119. Also, the video signal processing circuit 116 performs compression processing on an audio signal from a microphone 132 or an audio line input 133 and outputs the resulting signal to the memory controller 119. Furthermore, the video signal processing circuit 116 can output image data from the A/D conversion unit 115 and image data input from the memory controller 119 to the EVF (electronic view finder) monitor 118 through the EVF driving circuit 117. These functions are switched between in accordance with instructions from the microcomputer 123.

The video signal processing circuit 116 can output luminance information, white balance information, and the like of the image data (captured image data) signal from the A/D conversion unit 115 to the microcomputer 123, as needed. Based on these pieces of information, the microcomputer 123 performs instruction of white balance and gain adjustment. During continuous shooting, the video signal processing circuit 116 stores the unprocessed captured (shot) image data in the buffer memory 122. Then, after the shooting operation ends, the video signal processing circuit 116 reads out the unprocessed captured image data from the buffer memory 122 through the memory controller 119 and applies image processing and encoding processing thereto. Accordingly, the number of images that can be imaged continuously depends on the capacity of the buffer memory 122. Audio data input from the microphone 132 or the audio line input 133 through the A/D conversion unit 134 can also be output to the speaker 136 through a D/A conversion unit 135 by the video signal processing circuit 116.

An operation member 124 is a group of input devices for allowing a user to give instructions to the image capture apparatus 100, and includes a button, a switch, a dial, a touch panel, a key, and the like. An operation of the operation member 124 is detected by the microcomputer 123, and the microcomputer 123 performs processing in accordance with the operation. Representative examples of input devices included in the operation member 124 include a release switch, an ISO setting button, an image size setting button, an image quality setting button, an information display button, a menu button, a direction key, an execution key, and the like.

A first switch 125 and a second switch 126 are switches that are turned on by a half-press operation and a full-press operation performed on a release button included in the operation member 124. The turning-on of the first switch 125 is an instruction to start a shooting preparation operation, whereby the microcomputer 123 starts auto-focus and automatic exposure control. The turning-on of the first switch 125 and the second switch 126 is an instruction to start the actual shooting (shooting processing for record), whereby the microcomputer 123 executes the exposure of the image sensor 112 and a series of operations on the captured image data. Also, while both the first switch 125 and the second switch 126 continue to be turned on, the microcomputer 123 executes a continuous shooting operation.

A display driving circuit 127 drives a main display device 128 and an auxiliary display device 129 in accordance with control performed by the microcomputer 123. The main display device 128 and the auxiliary display device 129 are liquid crystal displays, for example, and generally, the main display device 128 is arranged on the back surface of the housing and the auxiliary display device 129 is arranged inside of the optical finder. Also, a backlight such as an LED (not shown) is arranged on the auxiliary display device 129, and the LED is also driven by the display driving circuit 127. Based on data of an estimated value for the image size obtained according to the ISO sensitivity, image size, and image quality, which are set before shooting, the microcomputer 123 can calculate the remaining number of images that can be imaged upon checking the capacity of the memory through the memory controller 119. The remaining number of images that can be imaged can also be displayed on the main display device 128 and the auxiliary display device 129 as needed.

A non-volatile memory (EEPROM) 130 stores programs, setting information, and the like. A power source unit 131 supplies a power source needed for the units of the image capture apparatus 100.

FIG. 2 is a diagram schematically showing a circuit configuration of the image sensor 112. The image sensor 112 includes a pixel array 201, a vertical selection circuit 202 that selects a row of the pixel array 201, and a horizontal selection circuit 204 that selects a column of the pixel array 201. Also, a readout circuit 203 reads out signals of pixels selected by the vertical selection circuit 202 among the pixels in the pixel array 201. A serial interface (SI) 205 is provided in order to make it possible to set the operation mode and the like of the circuits in the image sensor 112 from outside of the image sensor 112 (here, from the video signal processing circuit 116).

The readout circuit 203 includes a memory for storing signals, a gain amplifier, an AD converter, and the like for each row. Typically, the vertical selection circuit 202 selects multiple rows of the pixel array 201 in sequence and reads them out to the readout circuit 203. Furthermore, the image sensor 112 includes the horizontal selection circuit 204, which selects multiple pixel signals read out to the readout circuit 203 in sequence for each row.

FIGS. 3A and 3B are diagrams schematically showing examples of configurations of pixels arranged in the pixel array 201 of the image sensor 112 of the present invention. In the present embodiment, pixels 300 and 310 include microlenses 301 and 311 respectively, and multiple photodiodes (hereinafter referred to as PDs) or photoelectric conversion regions. The pixel 300 shown in FIG. 3A has two PDs 302a and 302b, and the pixel 310 shown in FIG. 3B has four PDs 312a, 312b, 312c, and 312d. Note that any number of PDs per pixel can be used as long as it is two or more, and the number of pixels in the horizontal direction and the vertical direction may be different. Note that the image sensor 112 is configured to be able to perform readout by adding together the outputs of the multiple PDs in the pixels in any combination. For example, the added outputs of the PDs 312a and 312c and the added outputs of the PDs 312b and 312d may be read out from the pixel 310 shown in FIG. 3B. Also, the added outputs of the PDs 312a and 312b and the added outputs of the PDs 312c and 312d may be read out. Of course, the added outputs of the PDs 312a, 312b, 312c, and 312d may also be read out. Note that the outputs of the PDs may also be added together after being read out. Note that aside from the constituent elements shown in the drawings, the pixels 300 and 310 are also provided with pixel amplification amplifiers for reading out signals of PDs to the readout circuit 203, selection switches for selecting a row, reset switches for resetting the signals of the PDs, and the like, for example.

FIG. 4 is a diagram schematically showing the pixel array 201, in which pixels 400 with the configuration shown in FIG. 3B are arranged. The pixel array 201 has a configuration in which N pixels are arranged linearly in the horizontal direction and M pixels are arranged linearly in the vertical direction, in order to provide a two-dimensional image. Each pixel 400 in the pixel array 201 is provided with a red, green, or blue color filter, and here, pixels in odd-numbered rows are alternatingly provided with red and green color filters, and pixels in even-numbered rows are alternatingly provided with green and blue color filters.

FIG. 5 will be used to describe the relationship between light fluxes received by the PDs and regions of the exit pupil in the image sensor 112 with the pixel array 201 having the configuration shown in FIG. 4. Light exiting from an exit pupil 506 of the shooting lens 101 is incident on the image sensor 112 centered about an optical axis 509. The outer edges of a light flux exiting from a partial region 507 of the exit pupil are denoted by reference numerals 510 and 511, and the outer edges of a light flux exiting from a partial region 508 are denoted by reference numerals 512 and 513. As shown in the drawing, the light flux exiting from the region of the exit pupil 506 above the optical axis 509 in the drawing is incident on the PD 312b, and the light flux exiting from the region on the lower side is incident on the PD 312a. In other words, light exiting from the different partial regions 508 and 507 in the exit pupil 506 of the shooting lens 101 is incident on the PDs 312a and 312b. Accordingly, an image constituted by the outputs of the PDs 312a of the pixels and an image constituted by the outputs of the PDs 312b are parallax images. Thus, the image capture apparatus 100 of the present embodiment has the image sensor 112, which is capable of generating multiple parallax images (first images) with one shooting operation.

In the present specification, image data obtained from the group of PDs shown on the right side of the pixels in FIGS. 3A and 3B (PDs 312b and 312d in FIG. 3B) will be referred to as a "right image", and image data obtained from the group of PDs on the left side of the pixels (PDs 312a and 312c in FIG. 3B) will be referred to as a "left image". Also, an image obtained by adding together the right image and the left image will be referred to as a "normal image" (non-parallax image). A normal image (second image) can be generated using a method of generating a normal image by reading out the right image and the left image separately and then adding them together, or using a method of reading out the added outputs of the PDs from each pixel. Here, the normal image and the right image are read out from the image sensor 112. Note that if the image sensor 112 has the pixel configuration shown in FIG. 3A, it is sufficient that the image data obtained from the group of PDs 302b is used as the right image and the image data obtained from the group of PDs 302a is used as the left image.

FIG. 6A is a block diagram showing an example of a functional configuration of a portion of the video signal processing circuit 116.

A normal image extraction unit 601 (second obtaining unit) extracts a normal image from a normal image and a right image read out from the image sensor 112 and outputs the normal image to a developing processing unit 602 and a lossless compression processing unit 606.

A right image extraction unit 605 (first obtaining unit) extracts only the right image from the normal image and the right image read out from the image sensor 112 and outputs the right image to the lossless compression processing unit 606.

The developing processing unit 602 performs developing processing such as white balance adjustment, color interpolation, color correction, gamma conversion, edge enhancement, resolution conversion, and the like on the normal image and outputs the resulting image to a lossy compression processing unit 603.

The lossy compression processing unit 603 generates a lossy compressed image by performing lossy compression processing in accordance with a standard such as JPEG format, for example, on the developed normal image. The lossy compression processing unit 603 outputs the lossy compressed image to the buffer memory 122 via a memory interface 604 and the memory controller 119.

The lossless compression processing unit 606 generates lossless compressed images by performing lossless compression processing on both the normal image and the right image, and outputs the lossless compressed images to the buffer memory 122 via the memory interface 604 and the memory controller 119.

Next, with reference to the flowchart shown in FIG. 7A, operations at a time of shooting performed by the image capture apparatus 100 of the present embodiment will be described with a focus on operations performed by the image signal processing circuit 116 (file generation unit). The processing shown in FIG. 7A is started due to the microcomputer 123 detecting a shooting start instruction (e.g., turning-on of the second switch 126). The microcomputer 123 controls the operations of the diaphragm 104 and the focal plane shutter 110 according to exposure conditions determined in shooting preparation processing and exposes the image sensor 112 to light.

In step S101, the video signal processing circuit 116 performs setting such that the normal image and the right image are read out to the image sensor 112 through the SI 205, and obtains the normal image and the right image.

In step S102, the normal image extraction unit 601 extracts the normal image and the right image extraction unit 605 extracts the right image. The extracted image data is stored in the buffer memory 122 via the memory interface 604 and the memory controller 119.

The processing of subsequent step S110, steps S120 and S121, and step S130 can be executed in parallel, or a portion thereof may be performed sequentially, according to how much space is left in the memory 120, the processing speed of the video signal processing circuit 116, and the like.

In step S110, the lossless compression processing unit 606 applies lossless compression processing to the normal image so as to generate a lossless compressed image and stores the lossless compressed image in the buffer memory 122 via the memory interface 604 and the memory controller 119.

In step S120, the developing processing unit 602 applies the above-described developing processing to the normal image and outputs the resulting image to the lossy compression processing unit 603.

In step S121, the lossy compression processing unit 603 applies lossy compression processing to the developed normal image so as to generate a lossy compressed image and scales down the lossy compressed image so as to generate a thumbnail image. Here, the lossy compressed image is a display image. The lossy compression processing unit 603 stores the lossy compressed image (display image) and the thumbnail image in the buffer memory 122 via the memory interface 604 and the memory controller 119.

In step S130, the lossless compression processing unit 606 applies lossless compression processing to the right image so as to generate a lossless compressed image (right) and stores the resulting image in the buffer memory 122 via the memory interface 604 and the memory controller 119.

Upon completion of the processing of steps S110, S121, and S130, the video signal processing circuit 116 moves to the processing of step S140 and generates an image file. The video signal processing circuit 116 reads out the lossless compressed image, the lossless compressed image (right), the display image, and the thumbnail image from the buffer memory 122 and generates the image file. The image file generation processing performed in step S140 and the image file configuration will be described in detail later.

In step S141, the video signal processing circuit 116 stores the generated image file in the memory 120 via the memory interface 604 and the memory controller 119, and the shooting processing ends.

FIG. 8A is a diagram showing the structure of an image file conforming to a Tagged Image File Format (TIFF) serving as an example of a file format corresponding to a multi-page file in which multiple pages of image data are contained in one file. An image file 800 shown in FIG. 8A is constituted by a TIFF header portion 801, multiple Image File Directory (IFD) portions 802 to 805, and multiple image data portions 806 to 809.

The TIFF header portion 801 is a region containing data for identifying that the file has a TIFF-format file structure, an offset to the first IFD portion, and the like.

The IFD portions 802 to 805 are regions containing metadata A to D, such as shooting information and parameters relating to the image data contained in the image data portions 806 to 809, offset values E to H to the image data portions 806 to 809, and offset values to subsequent IFD portions. The final IFD portion contains a specific offset value that indicates that there is no subsequent IFD portion. Also, the IFD portions 802 to 805 are such that information such as the size of the image data (number of vertical and horizontal pixels) contained in the corresponding image data portion, information regarding whether or not the image is a scaled-down image, and the type, namely whether the image is a left image or a right image, are included in the metadata A to D. Accordingly, an apparatus that performs processing using the image file 810 can reference the IFD portions 802 to 805 so as to read out the appropriate image data corresponding to the application from the multiple pieces of image data.

A 0th IFD portion 802 is a region corresponding to a 0th image data portion 806. One IFD portion corresponds to one image data portion, and the start positions of the pieces of image data in the image file 800 are specified by the offset values E to H of the IFD portions 802 to 805.

FIG. 8B is a diagram showing an example of the structure of an image file generated by the image capture apparatus 100 (video signal processing circuit 116) of the present embodiment. Here, an example of the structure in the case of generating a TIFF-format image file containing a lossy compressed image (display image), thumbnail image, lossless compressed image, and lossless compressed image (right) generated at the time of shooting is shown.

The image file 810 is constituted by a TIFF header portion 811, a 0th IFD portion 812 to a 3rd IFD portion 815, a thumbnail image portion 817, a display image portion 816, a normal image portion 818, and a right image portion 819.

The TIFF header portion 811 contains data for identifying that the file has a TIFF file structure.

The 0th IFD portion 813 contains metadata B such as shooting information and parameters relating to the display image portion 816, and the offset value F to the display image portion 816.

The 1st IFD portion 812 contains metadata A such as shooting information and parameters relating to the thumbnail image portion 817, and the offset value E to the thumbnail image portion 817.

The 2nd IFD portion 814 contains metadata C such as shooting information and parameters relating to the normal image portion 818, and the offset value G to the normal image portion 818.

The 3rd IFD portion 815 contains metadata D such as shooting information and parameters relating to the right image portion 819, and the offset value H to the right image portion 819.

These offset values E to H can be used to specify the start positions of the pieces of image data in the image file.

The display image portion 816 is a region containing the display image generated by the lossy compression processing unit 603 in order to perform display thereof on the main display device 128 or the like. In the present embodiment, the display image is in a JPEG format.

The thumbnail image portion 817 is a region containing a thumbnail image to be used when performing index display such as a screen showing a list of images in the memory 120 on the main display device 128, or the like, and is an image obtained by scaling down the display image by performing thinning or the like.

The normal image portion 818 is a region containing the normal image, which is obtained by adding together or combining the left image and the right image, and which is obtained by subjecting an undeveloped normal image in a so-called RAW format to lossless compression with the lossless compression processing unit 606.

The right image portion 819 is a region containing the right image obtained by subjecting the right image in a RAW format to lossless compression with the lossless compression processing unit 606. An image corresponding to the left image can be generated by subtracting the right image from the normal image. The right image and the left image can be used to perform refocus processing, viewpoint changing processing, three-dimensional image generation processing, and the like.

Data of developed images to be used in general-purpose display processing, such as the thumbnail image and the display image, are arranged in front of the normal image, which requires developing processing, and the right image, which is not used by an application that does not support parallax images. For this reason, the amount of time needed before the start of readout of image data with a high likelihood of being used can be shortened.

FIG. 9 is a block diagram showing an example of a functional configuration of a computer device 200 serving as an example of an electronic device that can use the image data stored in the image file generated by the image capture apparatus 100 of the present embodiment. A CPU 1 functioning as a control unit reads out programs contained in a storage device 10, for example, which here are a developing processing application, a refocus processing application, a viewpoint changing processing application, and the like, to a RAM 3, and executes them so as to realize later-described image processing. Note that the storage device 10 is a hard disk drive (HDD), a solid-state drive (SSD), or the like, and stores basic software (OS), device drivers, application programs, and the like. GUI data for displaying menu screens and the like, user setting data, initial setting data of applications, and the like are also stored in the storage device 10.

The ROM 2 stores programs and firmware that are needed for the computer device 200 to start up, such as a bootstrap loader, and the like. At least a portion of the ROM 2 may be rewritable.

The RAM 3 is used as a region for dispatching programs to be executed by the CPU 1, and as a temporary storage region for variables, data, and the like. A memory card 4 may be a detachable memory 120. The computer device 200 can obtain an image file from the memory card 4 mounted in the memory card slot 5, an external device 40 connected to a communication interface 20, or the storage device 10.

The display unit 6 is a dot-matrix display device represented by a liquid crystal display (LCD) or an organic EL display. Note that FIG. 9 shows a configuration in which the display unit 6 is built into the computer device 200, but the display unit 6 may be connected as an external apparatus. Also, the display unit 6 may be constituted by both a built-in display and an external display.

The operation unit 8 is a device that allows a user to input instructions to the computer device 200, and is represented by one or more input device such as a pointing device (mouse, etc.) or a touch detection device (touch panel, etc.). Note that the keyboard may be a hardware keyboard or a software keyboard. Note that the display unit 6 may be provided with the touch panel, or a mode of using a touch pad often found in laptop personal computers may also be used. Furthermore, if the computer device 200 has sensors provided in order to detect movement or tilting of the apparatus, the operation unit 8 may also include these sensors. A non-contact input device such as an audio input device or an eyesight input device may also be included in the operation unit 8.

The communication interface 20 is, for example, one or more communication interfaces for performing data communication with the external device 40, such as the image capture apparatus 100. The communication interface 20 includes a configuration conforming to a wired and/or wireless communication standard such as USB, Ethernet®, or IEEE 802.11x. The image capture apparatus 100 and the computer device 200 can form an image processing system by being communicably connected via the communication interface 20.

Next, operations at a time when the image file 810 generated in the present embodiment is used by the computer device 200 will be described with reference to the flowcharts shown in FIGS. 10A, 10B, and 11. Note that the operation described below can be carried out as one function of any application program run by the computer device 200.

FIG. 10A is a flowchart showing an operation at a time of displaying a thumbnail image contained in the thumbnail image portion 817 of the image file 810. Since the thumbnail image is a scaled-down image, for example, it is used in the application of roughly displaying the contents of the images contained in the image file in a case where a list of the contents of image files contained in a specific location of the memory card 4 or the storage device 10 is to be displayed, or the like. Here, although a case of displaying a thumbnail image for one image file 810 will be described, in the case of displaying thumbnail images for multiple image files, the processing of FIG. 10A is executed for each individual image file.

In step S1601, the CPU 1 reads out the TIFF header portion 811 of the target image file 810 and stores it in the RAM 3.

In step S1602, the CPU 1 specifies the start position of the first (N=0) IDF portion (0th IFD portion 812) from the TIFF header portion 811, reads out the 0th IFD portion 812, and stores it in the RAM 3.

In step S1603, the CPU 1 determines, based on the information of the 0th IFD portion 812, whether or not the 0th image portion (display image portion 816) corresponding to the 0th IFD portion 812 contains the thumbnail image (scaled-down image). In the present embodiment, the 0th image portion is the display image portion 816, and therefore the CPU 1 moves to the processing of step S1604, increments N by 1, and returns to the processing of step S1602.

Upon reading out the 1st IFD portion 813 in step S1602, the CPU 1 determines in step S1603 that the corresponding 1st image portion contains the scaled-down image, and moves to the processing of step S1605.

In step S1605, the CPU 1 reads out the thumbnail image data from the 1st image portion (thumbnail image portion 817) and stores it in the display image region of the RAM 3.

In step S1606, the CPU 1 causes the thumbnail image to be displayed on the display unit 6 in a pre-determined layout.

FIG. 10B is flowchart showing an operation at a time of displaying a display image (lossy compressed image) contained in the display image portion 816 of the image file 810. Steps in which processing is performed which is the same as that in FIG. 10A are denoted by the same reference numerals thereas. The number of pixels (resolution) of the display image is the same as that of the normal image, but the image quality is reduced due to having been subjected to lossy compression. Also, since the display image has been developed, whereas the normal image has not been developed, the display image can be displayed using a general-purpose apparatus. Here, a case of displaying a display image for one image file 810 will be described.

The processing of steps S1601 and S1602 is the same as in FIG. 10A, and therefore description thereof will not be repeated here.

In step S1607, the CPU 1 determines, based on the information of the 0th IFD portion 812, whether or not the 0th image portion (display image portion 816) corresponding to the 0th IFD portion 812 contains the display image. In the present embodiment, the 0th image portion is the display image portion 816, and therefore the CPU 1 moves to the processing of step S1608.

In step S1608, the CPU 1 reads out the display image data from the 0th image portion (display image portion 816) and stores it in the display image region of the RAM 3.

In step S1609, the CPU 1 causes the display image to be displayed on the display unit 6 in a pre-determined layout.

FIG. 11 is a flowchart showing an operation at a time of generating parallax images using images contained in the normal image portion 818 and the right image portion 819 of the image file 810 and performing processing using the parallax images. Steps in which processing that is the same as that in FIG. 10A are denoted by the same reference numerals thereas. Here, processing using the normal image and the right image included in the one image file 810 will be described.

The processing of steps S1601 and S1602 is the same as that in FIG. 10A, and therefore description thereof will not be repeated here.

In step S1610, the CPU 1 determines, based on the information of the 0th IFD portion 812, whether or not the 0th image portion (display image portion 816) corresponding to the 0th IFD portion 812 contains the normal image. In the present embodiment, the 0th image portion is the display image portion 816, and therefore the CPU 1 moves to the processing of step S1612, and determines, based on the information of the 0th IFD portion 812, whether or not the 0th image portion (display image portion 816) corresponding to the 0th IFD portion 812 contains the right image. In the present embodiment, the 0th image portion is the display image portion 816, and therefore the CPU 1 moves to the processing of S1604, increments N by 1, and returns to the processing of step S1602.

When step S1610 is executed in a state in which N=2, the CPU 1 determines that the 2nd image portion (normal image portion 818) contains the normal image, and moves to the processing of step S1611.

In step S1611, the CPU 1 reads out the normal image data from the 2nd image portion (normal image portion 818) and stores it in the RAM 3. Then, the CPU 1 moves to the processing of step S1604, increments N by 1, and returns to the processing of step S1602.

When step S1612 is executed in a state in which N=3, the CPU 1 determines that the 3rd image portion (right image portion 819) contains the right image, and moves to the processing of step S1613.

In step S1613, the CPU 1 reads out the right image data from the 3rd image portion (right image portion 819) and stores it in the RAM 3.

In step S1614, the CPU 1 generates the left image from the normal image read out in step S1611 and the right image read out in step S1613. As described above, the normal image corresponds to an added image or a combined image of the right image and the left image, and therefore the left image can be generated by subtracting the right image from the normal image.

In step S1615, the CPU 1 applies processing similar to that performed by the developing processing unit 602 to the right image and the left image. Note that depending on the content of the parallax image processing executed in step S1616, the developing processing may be applied after the parallax image processing and not in step S1615.

In step S1616, the CPU 1 performs image processing using the parallax images, such as refocus processing, viewpoint changing processing, defocus map generation processing, and three-dimensional image generation processing, on the developed right image and left image.

As described above, with the present embodiment, an image file is generated which contains data of a normal image corresponding to a combined image of multiple parallax images, and data of parallax images excluding parallax images that can be generated from the normal image and other parallax images, among the multiple parallax images. By including the normal image, it is possible to achieve compatibility with a device that does not support parallax images, and by not storing the parallax images that can be generated using the normal image and other parallax images, it is possible to suppress the size of the image file. Furthermore, by including a developed normal image as the normal image, it is possible to further increase the versatility or compatibility of the image file. In this case, by applying scale-down processing or lossy compression processing to the developed normal image, the file size can be suppressed. Also, by arranging the parallax images at the end of the file, it is possible to reduce the amount of time needed to obtain the desired image data in an apparatus or application that does not use parallax images.

Accordingly, with the above-described configuration, a configuration was described in which the normal image and the right image are stored, but a configuration may be used in which the left image is stored instead of the right image. In this case, it is sufficient to use a configuration in which the right image extraction portion 605 in the video signal processing circuit 116 is used as a left image extraction portion, and the left image is supplied to the lossless compression processing portion 606.

Alternatively, as shown in FIG. 6B, it is also possible to maintain the configuration in which the right image extraction unit 605 in the video signal processing circuit 116 is used as a left image extraction unit 901, a right image generation unit 902 that generates the right image from the normal image and the extracted left image is added, and the normal image and the right image are stored. In this case, it is sufficient that steps S1001 to S1003 in FIG. 7B are executed instead of steps S101 and S102 in FIG. 7A. In other words, after the normal image and the left image are read out in step S1001, the normal image is extracted by the normal image extraction unit 601, and the left image is extracted by the left image extraction unit 901 in step S1002. Then, in step S1002, the right image generation unit 902 generates the right image from the normal image and the extracted left image. Thereafter, processing similar to that in FIG. 7A may be used.

Also, if a configuration is used in which no normal image exists and the right image and the left image are obtained (read out), it is sufficient that an image file is generated which contains a normal image generated from the right image and the left image, and one of the right image and the left image.

Furthermore, in the present invention, two right-side outputs and two left-side outputs of an image sensor having four PDs or photoelectric conversion regions per pixel shown in FIG. 3B were each handled as a group, and were handled in substantially the same manner as parallax images obtained with the pixel configuration shown in FIG. 3A. However, the idea of the present embodiment can be applied also in the case of generating four parallax images by reading out four PDs separately. In this case, it is sufficient that at least (1) a normal image, (2) a right image or a left image, (3) an upper-right or lower-right image, and (4) an upper-left or lower-left image are contained. Here, the upper-right image is an image generated from the group of PDs 312*b*, the lower-right image is an image generated from the group of PDs 312*d*, the upper-left image is an image generated from the group of PDs 312*a*, and the lower-left image is an image generated from the group of PDs 312*c*. Also, the right image corresponds to addition or combination of the upper-right image and the lower-right image, and the left image corresponds to addition or combination of the upper-left image and the lower-left image.

For example, an image file containing a normal image, a right image, an upper-right image, and an upper-left image is generated. In this case, the left image can be generated as the difference between the normal image and the right image, the lower-right image can be generated as the difference between the right image and the upper-right image, and the lower-left image can be generated as the difference between the left image and the upper-left image. Note that the combination of PDs stated in the present embodiment is merely an example, and it is possible to use an upper image (addition of PDs 312*a* and 312*b*), a lower image (addition of PDs 312*c* and 312*d*), or addition in a diagonal direction (e.g., addition of PDs 312*a* and 312*d*). Also, the present invention can be applied to a parallax image obtained with an image sensor having a configuration in which the number of PDs per pixel is greater than four.

Second Embodiment

Next, a second embodiment of the present invention will be described. The present embodiment is similar to the first embodiment, except for the configuration of the video signal processing circuit and the image file generation operation, and therefore only the differences therefrom will be described.

FIG. 6C is a block diagram showing an example of a functional configuration of the video signal processing circuit 116 of the present embodiment, constituent elements that are the same as those of the first embodiment are denoted by the same reference numerals as in FIG. 6A or 6B, and redundant description thereof is not included here. The video signal processing circuit 116 of the present embodiment includes the right image extraction unit 605 shown in FIG. 6A instead of the left image extraction unit 901 shown in FIG. 6B, and includes a left image generation unit 902' instead of the right image generation unit 902. Note that the left image generation unit 902' is substantially the same constituent element as the right image generation unit 902, in that it obtains the difference between a normal image and a parallax image.

FIG. 12 is a diagram showing an example of a structure of an image file 1100 generated by the video signal processing circuit 116 of the present embodiment, in which constituent elements in common with the first embodiment are denoted by the same reference numerals as in FIG. 8B, and redundant description thereof will not be repeated here. The image file 1100 of the present embodiment has a structure obtained by adding a right thumbnail image portion 1104, a left thumbnail image portion 1105, and a 3rd IFD portion 1101 and 4th IFD portion 1102 corresponding thereto to the image file 810 of the first embodiment. Also, the 3rd IFD portion 815 in the image file 810 has been brought down to the 5th IFD portion 1103.

Next, operations at a time when the image capture apparatus 100 of the present embodiment performs shooting will be described with a focus on operations performed by the video signal processing circuit 116, with reference to the flowchart shown in FIG. 13, in addition to FIGS. 6C and 12. Configurations in common with the first embodiment are denoted by the same reference numerals as in FIG. 7A, and redundant description thereof will not be included here.

In step S1200, the left image generation unit 902' generates the left image by subtracting the right image from the normal image.

The processing of the subsequent step S110, steps S120 and S121, step S130, steps S1210 and S1211, and steps S1220 and S1221 can be performed in parallel. Note that at least a portion thereof may be performed sequentially, according to how much space is left in the memory 120, the processing speed of the video signal processing circuit 116, and the like.

In step S1210, the developing processing unit 602 applies the above-described developing processing to the right image and outputs the resulting image to the lossy compression processing unit 603.

In step S1211, the lossy compression processing unit 603 generates a lossy compressed image (right) by applying lossy compression processing to the developed right image, and generates the right thumbnail image by scaling down the lossy compressed image (right). The lossy compression processing unit 603 stores the right thumbnail image in the buffer memory 122 via the memory interface 604 and the memory controller 119.

In steps S1220 and S1221, the developing processing unit 602 and the lossy compression processing unit 603 generate a left thumbnail image by executing processing similar to that of steps S1210 and S1211 on the left image. The lossy compression processing unit 603 stores the left thumbnail image in the buffer memory 122 via the memory interface 604 and the memory controller 119.

Upon completing the processing of steps S110, S121, S130, S1211, and S1221, the video signal processing circuit 116 moves to the processing of step S140 and generates the image file. The video signal processing circuit 116 generates the image file by reading out a lossless compressed image, a lossless compressed image (right), a display image, a thumbnail image, a right thumbnail image, and a left thumbnail image from the buffer memory 122.

As described above, the image file 1100 generated in the present embodiment has the following configuration added to the image file 810 generated in the first embodiment. That is, the 3rd IFD portion 1101, which is an IFD for the right thumbnail image, the 4th IFD portion 1102, which is an IFD for the left thumbnail image, the 5th IFD portion 1103, which is an IFD for the right image, the right thumbnail image portion 1104, and the left thumbnail image portion 1105.

The 3rd IFD portion 1101 contains metadata I such as shooting information and parameters relating to the right thumbnail image portion 1104, and an offset value L to the right thumbnail image portion 1104.

The 4th IFD portion 1102 contains metadata J such as shooting information and parameters relating to the left thumbnail image portion 1105, and an offset value M to the left thumbnail image portion 1105.

The 5th IFD portion 1103 contains metadata D such as shooting information and parameters relating to the right image portion 819, and an offset value H to the right image portion 819.

These offset values H, L, and M can be used to specify the start positions of the pieces of image data in the image file.

The right thumbnail image portion 1104 and the left thumbnail image portion 1105 are regions containing images to be used in the case of displaying parallax images in index display, such as a screen with a list of images, on the main display device 128, for example, or when displaying an image generated using parallax images.

In the present embodiment, the right thumbnail image and the left thumbnail image, which are thumbnail images of parallax images, are furthermore included in the image file. For this reason, in addition to the effect of the first embodiment, display using parallax images and display of images generated using parallax images can be performed easily with an apparatus capable of using parallax images. In other words, by merely specifying the right thumbnail image portion and the left thumbnail image portion from the IFD portions and reading out the right thumbnail image and the left thumbnail image, parallax image processing can be executed immediately. Also, the file size increases by a significantly smaller amount compared to the case of performing storage by adding the left image to the image file of the first embodiment, and there is no need to perform developing processing, and therefore the load of the apparatus using the parallax images can also be reduced.

Modified Example 1

Note that in the second embodiment, a configuration may be used in which an image file including a right display image and a left display image instead of a right thumbnail image and a left thumbnail image is generated. In this case, the structure of the image file is like that shown in FIG. 14. As can be understood by comparison with FIG. 12, a right display image portion 1304 and a left display image portion 1305 are included instead of the right thumbnail image portion 1104 and the left thumbnail image portion 1105. Also, the 3rd IFD portion 1301 and the 4th IFD portion 1302 include information corresponding to the right display image portion 1304 and the left display image portion 1305, respectively.

The processing during shooting may be basically the same as that shown in FIG. 13, or it is sufficient to use a configuration in which in step S140, the image file contains a right display image and a left display image generated before the right thumbnail image and the left thumbnail image are generated in steps S1211 and S1221.

Modified Example 2

Note that in the second embodiment, a configuration may be used in which an image file furthermore including the right display image and the left display image in addition to the right thumbnail image and the left thumbnail image is generated. In this case, the structure of the image file is like that shown in FIG. 15. As can be understood by comparison with FIG. 12, the right display image portion 1304 and the left display image portion 1305 are added (inserted) after the thumbnail images and before the right image. Also, the 5th IFD portion 1401 and the 6th IFD portion 1402 include information corresponding to the right display image portion 1304 and the left display image portion 1305. Also, the position of the IFD portion corresponding to the right image portion 819 has been changed to that of the 7th IFD portion 1403.

The processing during shooting may be basically the same as that shown in FIG. 13, and it is sufficient to use a configuration in which in step S140, the image file contains the right display image, the left display image, the right thumbnail image, and the left thumbnail image, which are generated in steps S1211 and S1221.

In the modified examples 1 and 2, the file size is greater than in the basic form of the second embodiment, but display processing using parallax images with higher resolutions can be performed easily, and parallax images with resolutions corresponding to the application thereof can be used. Accordingly, the modified examples are particularly useful in the case where the processing ability of the apparatus using the image files is low.

Other Embodiments

The embodiments above described a case in which the present invention was applied to the generation of an image file containing parallax images. However, the present invention can also be applied to the generation of an image file containing other images having a relationship between a portion and the whole, as with parallax images and a normal image, or a relationship in which one image is generated from another.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
one or more processors; and
a memory storing instructions which, when the instructions are executed by the one or more processors, cause the image processing apparatus to function as:
a first obtaining unit configured to obtain data of one or more of a plurality of first images;
a second obtaining unit configured to obtain data of a second image that can be generated from the plurality of first images; and
a file generation unit configured to generate an image file containing the data of the second image and data of a subset of the plurality of first images,
wherein the file generation unit generates the image file such that the data of the subset of the plurality of the first images does not contain data of, among the plurality of first images, a first image that can be generated from data of the subset of the plurality of the first images and the second image contained in the image file, and
wherein the file generation unit stores in the image file data of the second image data and the data of the subset of the plurality of first images in order.

2. The image processing apparatus according to claim 1, wherein the second image corresponds to a combined image of the plurality of first images.

3. The image processing apparatus according to claim 1, wherein the file generation unit stores a plurality of pieces of data of the second image in the image file.

4. The image processing apparatus according to claim 1, wherein the file generation unit stores undeveloped data of the plurality of first images in the image file.

5. The image processing apparatus according to claim 1, wherein the file generation unit stores undeveloped data of the second image and developed data of the second image in the image file.

6. The image processing apparatus according to claim 5, wherein the developed data includes multiple pieces of data with different resolutions.

7. The image processing apparatus according to claim 1, wherein the file generation unit stores undeveloped data of the subset of the plurality of first images and developed data of the subset of the plurality of first images in the image file.

8. The image processing apparatus according to claim 1, wherein the plurality of first images are parallax images.

9. The image processing apparatus according to claim 1, further comprising an image sensor capable of generating data of the plurality of first images and data of the second image.

10. An electronic device comprising:
one or more processors; and
a memory storing instructions which, when the instructions are executed by the one or more processors, cause the image processing apparatus to function as:
an obtaining unit configured to obtain an image file containing data of a subset of a plurality of first images, and data of a second image that can be generated from the plurality of first images;
a generation unit configured to generate data of, among the plurality of first images, a first image not contained in the image file from the data of the second image and the data of the subset of the plurality of first images contained in the image file; and
an image processing unit configured to apply image processing to the data of the subset of the plurality of first images contained in the file and to the data of the first image generated by the generation unit, and
wherein the image file contains the data of the second image and the data of the subset of the plurality of first images in order.

11. The electronic device according to claim 10, wherein the second image corresponds to a combined image of the plurality of first images.

12. The electronic device according to claim 10, wherein the plurality of first images are parallax images.

13. The electronic device according to claim 10, wherein the image processing includes at least one of refocus processing, viewpoint changing processing, defocus map generation processing, and three-dimensional image generation processing.

14. An image processing system comprising:
an image capture apparatus that comprises:
an image sensor configured to generate data of a plurality of first images and data of a second image; and
an electronic device that comprises:
one or more processors; and
a memory storing instructions which, when the instructions are executed by the one or more processors, cause the image processing apparatus to function as:
an obtaining unit configured to obtain an image file containing data of a subset of a plurality of first images, and data of a second image that can be generated from the plurality of first images;
a generation unit configured to generate data of, among the plurality of first images, a first image not contained in the image file from the data of the second image and the data of the subset of the plurality of first images contained in the image file; and
an image processing unit configured to apply image processing to the data of the subset of the plurality of first images contained in the image file and to the data of the first image generated by the generation unit,
the image capture apparatus and the electronic device being communicably connected,
wherein the image file contains the data of the second image and the data of the subset of the plurality of first images in order.

15. A method for controlling an image processing apparatus, comprising:
obtaining data of one or more of a plurality of first images;
obtaining data of a second image corresponding to a combined image of the plurality of first images; and
generating an image file containing the data of the second image and data of a subset of the plurality of first images,
wherein the image file is generated such that the data of the subset of the plurality of first images does not contain data of, among the plurality of first images, a first image that can be generated from the data of the subset of the plurality of first images and the data of the second image contained in the image file.

16. A method for controlling an electronic device, comprising:

obtaining an image file containing data of a subset of a plurality of first images, and data of a second image corresponding to a combined image of the plurality of first images;

generating data of, among the plurality of first images, a first image not contained in the image file from the data of the second image and the data of the subset of the plurality of first images contained in the image file; and applying image processing to the data of the subset of the plurality of first images contained in the image file and to the data of the first image generated in the generating, wherein, in the image file, the data of the second image and the data of the subset of the plurality of first images are contained in order.

17. A non-transitory computer-readable storage medium containing a program for causing a computer to function an image processing apparatus comprising:
   a first obtaining unit configured to obtain data of one or more of a plurality of first images;
   a second obtaining unit configured to obtain data of a second image that can be generated from the plurality of first images; and
   a file generation unit configured to generate an image file containing the data of the second image and data of a subset of the plurality of first images,
   wherein the file generation unit generates the image file such that the data of the subset of the plurality of first images does not contain data of, among the plurality of first images, a first image that can be generated from data of the subset of the plurality of first images and data of the second image contained in the image file, and
   wherein the file generation unit stores in the image file the data of the second image and the data of the subset of the plurality of first images in order.

18. A non-transitory computer-readable storage medium containing a program for causing a computer to function as an electronic device comprising:
   an obtaining unit configured to obtain an image file containing data of a subset of a plurality of first images, and data of a second image that can be generated from the plurality of first images;
   a generation unit configured to generate data of, among the plurality of first images, a first image not contained in the image file from the data of the second image and the data of the subset of the plurality of first images contained in the image file; and
   an image processing unit configured to apply image processing to the data of the subset of the plurality of first images contained in the file and to the data of the first image generated by the generation unit,
   wherein the image file contains the data of second image and the data of the subset of the plurality of first images in order.

* * * * *